United States Patent
Chang

(10) Patent No.: US 8,832,616 B2
(45) Date of Patent: Sep. 9, 2014

(54) VOLTAGE DROP EFFECT ON STATIC TIMING ANALYSIS FOR MULTI-PHASE SEQUENTIAL CIRCUIT

(75) Inventor: Mau-chung Chang, Hillsborough, CA (US)

(73) Assignee: Sage Software, Inc., Hillsborough, CA (US)

( * ) Notice: Subject to any disclaimer, the term of this patent is extended or adjusted under 35 U.S.C. 154(b) by 0 days.

(21) Appl. No.: 13/414,052

(22) Filed: Mar. 7, 2012

(65) Prior Publication Data

US 2012/0240087 A1 Sep. 20, 2012

Related U.S. Application Data

(60) Provisional application No. 61/454,471, filed on Mar. 18, 2011.

(51) Int. Cl.
*G06F 17/50* (2006.01)

(52) U.S. Cl.
CPC ........ *G06F 17/5031* (2013.01); *G06F 17/5036* (2013.01); *G06F 2217/78* (2013.01); *G06F 2217/84* (2013.01)
USPC ........................................................ 716/108

(58) Field of Classification Search
USPC ......................................... 716/100, 110, 108
See application file for complete search history.

(56) References Cited

U.S. PATENT DOCUMENTS

| | | | |
|---|---|---|---|
| 5,872,952 A | 2/1999 | Tuan et al. | |
| 5,933,358 A | 8/1999 | Koh et al. | |
| 6,249,898 B1 | 6/2001 | Koh et al. | |
| 6,453,443 B1 | 9/2002 | Chen et al. | |
| 7,142,991 B2 | 11/2006 | Hathaway et al. | |
| 7,225,418 B2 | 5/2007 | Shimazaki et al. | |
| 7,240,304 B2 | 7/2007 | Dutta et al. | |
| 7,525,373 B1 * | 4/2009 | Ogilvie et al. | 327/564 |
| 7,600,208 B1 * | 10/2009 | Sharma et al. | 716/120 |
| 7,900,175 B2 | 3/2011 | Chang | |
| 7,917,821 B2 | 3/2011 | Lee | |
| 8,051,399 B2 | 11/2011 | Vishweshwara et al. | |
| 2004/0249588 A1 * | 12/2004 | Shimazaki et al. | 702/66 |
| 2005/0144497 A1 * | 6/2005 | Song et al. | 713/503 |
| 2006/0220751 A1 * | 10/2006 | Nakashiba et al. | 331/16 |

(Continued)

OTHER PUBLICATIONS

An-Chang Deng, Yan-Chyuan Shiau and Kou-Hung Loh, Time Domain Current Waveform Simulation of CMOS circuits, Proc. ICCAD-88, pp. 208-211, 1988.

(Continued)

*Primary Examiner* — Suchin Parihar

(57) ABSTRACT

In the present invention a method to address voltage drop effect in the path based timing analysis for multi-phase sequential circuit is proposed. In calculating the new delay of the gate along the specified path the fact that stored discrete arrival times with respect to different clock phases at each node is used to determine a set of gates that can have transitions overlapping with that of the said gate. Furthermore, the said set is reduced by the logic verification step. Two step approach is adopted, the first is to evaluate the power currents for the said reduced set of gates by using pre-characterized timing library, then use these currents to calculate new VDD of the said gate along the path and obtain new delay for this gate. Some cell may have several internal transitions, the process of modeling power currents in terms of several triangles is discussed.

17 Claims, 17 Drawing Sheets

(56) References Cited

U.S. PATENT DOCUMENTS

| | | | |
|---|---|---|---|
| 2008/0209290 A1* | 8/2008 | Lee | 714/729 |
| 2008/0209376 A1* | 8/2008 | Kazda et al. | 716/6 |
| 2008/0244473 A1* | 10/2008 | Parker et al. | 716/2 |
| 2009/0125858 A1* | 5/2009 | Vishweshwara et al. | 716/6 |
| 2010/0063761 A1* | 3/2010 | Frenkil | 702/69 |
| 2013/0300463 A1* | 11/2013 | Gemmeke et al. | 327/113 |

OTHER PUBLICATIONS

Jessica Qian, Satyamurthy Pullela, and Lawrence Pillage, Modeling the "Effective Capacitance" for the RC Interconnect of CMOS Gates, IEEE Transactions on Computer-Aided Design of Integrated Circuits and Systems, vol. 13, No. 12 pp. 1526-1535 Dec. 1994.

Alessandro Bogliolo, Luca Benin, and Giovanni De Micheli, Gate-level Power and Current Simulation of CMOS integrated Circuits, IEEE Transactions on Computer-Aided Design of Inegrated Circuits and Systems, vol. 5, No. 4 pp. 473-488 Dec. 1997.

Harish Kriplani, Farid N. Najm, and Ibrahim N. Hajj, IEEE Transactions on Computer-Aided Design of Integrated Circuits and Systems, vol. 14, No. 8, pp. 998-1012 Aug. 1995.

S. Bobba and I. N. Hajj, Estimation of Maximum Switching Activity in Digital VLSI circuits, Proc. of Midwest Symp. on Circuits and Syst., Sacramento, CA, Aug., 3-6, 1997, pp. 1130-1133.

S. Bobba and I. N. Hajj, Estimation of Maximum Current Envelope for Power Bus Analysis and Design, Proceedings of ISPD, Apr. 6-8 1998, pp. 141-146.

Yi-Min Jiang, Tak K. Young and Kwang-Ting Cheng, VIP—An Input Pattern Generator for Identifying Critical Voltage Drop for Deep Sub-Micron Designs, Proc. of International SymSymp. on Low Power Electronics ans Design, 1999, pp. 156-161.

Geng Bai, Sudhakar Bobba, and Ibrahim N. Hajj, Static Timing Analysis including Power Supply Noise Effect on Propagation Delay in VLSI Circuits, Proc. DAC 2001, pp. 295-300.

Hedi Harizi, Robert Häußler, Markus Olbrich and Erich Barke, Efficient Modeling Techniques for Dynamic Voltage Drop Analysis, Proc. DAC 2007, pp. 706-711.

* cited by examiner

VOLTAGE DROP EFFECT ON STATIC TIMING ANALYSIS FOR MULTI-PHASE SEQUENTIAL CIRCUIT

FIELD OF THE INVENTION

The present invention relates to integrated circuit design, and more particularly to a design timing verification tool that is capable of handling the effect of voltage drop and surge due to power and ground network on timing analysis for multi-phase sequential circuit.

BACKGROUND OF THE INVENTION

It is well-known that the power network due to capacitive or inductive effect can cause some voltage drop at the contact points of the devices and the power network, and similarly voltage surge for ground network. The voltage drop or surge can cause increase of propagation delay of the device, therefore degrading the performance of VLSI circuit. Nowadays due to the scaling of devices, the voltage drop induced increase of delay has become increasingly important.

Traditionally, this voltage drop issue has been addressed in both simulation and timing analysis. In simulation a two-step approach is adopted, namely, simulation is carried out first without power network and record the current at the contact points between devices and power network, secondly feed the currents at the contact points to the power network and perform a detailed simulation on the power network without the devices based on the limited set of vectors to obtain voltages of the power network nodes accurately and report voltage drops at those contact points and currents along the wires. However, if the worst case of the voltage drop for each of the gates is used to re-simulate the circuit, the result can be too pessimistic.

Another method to tackle the voltage drop issue is to use vector-less or timing analysis approach in which the critical paths can be identified. Kriplani et al. have proposed iMax algorithm which makes use of timing analysis to generate a timing window or the so-called uncertainty interval in which the gate can switch with power current associated with the switching. With all the possible switching during the uncertainty interval, the maximum envelope current (MEC) waveform for each gate is built up. At any point of time of the MEC waveform the current is maximum from all possible switching of the gate. The voltage drop is then calculated by using the MEC and the power network. This method can provide very pessimistic result. Bai et al. have improved the result by taking into account of functional dependences and have formulated this into an optimization problem to maximize the voltage drop by expressing voltage at bus nodes in terms of gate currents. Bai et al. also have proposed an approach utilizing a specified path in static timing analysis and get the current for each gate along this path, then figure out the voltage drop for this gate and re-calculate the gate delay based on the new supply voltage which can be different for different for the gates along the same path. The new path delay finally is achieved by summing all the new gate delays. This method is more realistic than the previous ones in the sense that the uncertain interval of the gate along the path is small, because we only limit the signal propagation along this path only. However, how to calculate accurate current for each gate accurately can be a very challenging problem.

The aforementioned method utilizing the specified path as provided by timing analysis looks promising, still there are some shortcomings which need to be overcome. In calculating voltage drop for one gate along the specified path the main difficulty lies in the fact how to choose the other gates with their switching overlapping with the switching of this gate along the path and include all the switching currents. By adopting functional dependency in the design, the whole path needs to be considered. For example, the rise or fall on the nodes along the path and some logic value, which may be VDD, GND, rise, or fall at the side inputs of the gates along the path need to considered explicitly in order to generate more sensible results. Besides, the circuit most likely contains multi-phase sequential elements. The node may store several delays times with respect to different clock phases which need to be considered in determining the overlapping of switching of gates. Furthermore, to increase accuracy the modeling part can be improved. The switching current for each gate or sequential element must be modeled using polynomial fit. The cell in ASIC design may contain several gates and the switching current need to be modeled by several triangles. By knowing these switching current for the gates, a delay calculator is used to calculate voltage drop and new updated path delay is followed accordingly, and more accurate critical path analysis is achieved. To accurately carry out critical path analysis including set up time and hold time checks, clock skew, set up time, and clock to output delay also need to be re-evaluated by considering voltage drop effect. In the clock skew analysis interconnect delay plays a pivotal role and for ASIC design the effective capacitance should be adopted.

SUMMARY OF THE INVENTION

This invention provides a voltage drop analysis tool and a method for performing voltage drop analysis of a circuit with multi-phase sequential elements, consisting of using timing analysis for multi-phase sequential circuit to generate critical path, verifying the timing of a specified path by re-evaluating the new path delay and new timing constraint including new clock skew, new set up time, new hold time and new clock to output delay etc. for sequential element in consideration of voltage drop effect and pre-characterizing the timing library for power current and ground currents.

According to another aspect, a voltage drop analysis tool according to the invention provides timing analysis for multi-phase sequential circuit with special algorithm in storing destination clock phases and discrete arrival times with respect to different source clock phases each node.

According to another aspect, a voltage drop analysis tool according to the invention provides a method of re-evaluating the new path delay includes re-evaluating the new gate delay, by finding a set of gates their switching overlapping with switching of this said gate by considering functional dependence and signal propagation in the presence of multi-phase sequential elements, feeding the switching currents for these gates to the power network to find voltage drop, and then calculating new gate delay based on the new VDD.

According to another aspect, a voltage drop analysis tool according to the invention provides a method of determining whether two timing windows in the presence of multi-phase sequential elements overlap, and the timing window is defined as follows, a gate A with input X with one stored arrival time D with respect to one clock phase and the delay from the X to output of A is $\Delta y$, and the timing window is defined as $[D, D+\Delta y]$.

According to another aspect, a voltage drop analysis tool according to the invention provides a special algorithm of considering functional dependence including assigning rise or fall along the node of the specified path, determining whether the side should be RISE, FALL, VDD or GND and iterating logic verification process to generate node value so that constraint graph can be reduced by only keeping node with node values RISE or FALL.

According to another aspect, a voltage drop analysis tool according to the invention provides a method reducing the constraint graph further by only considering a set of gates and their inputs with their transitions overlapping with that of a selected gate and its input along a specified path.

According to another aspect, a voltage drop analysis tool according to the invention provides a method characterizing the timing library including pre-characterizing power and ground currents of gate, logic cell consisting of several gates, and pre-characterizing set-up time, hold time, and clock to output delay etc. of sequential cell.

According to another aspect, a voltage drop analysis tool according to the invention provides a method modeling power current and ground current by a triangle in terms of Q, T0, Tr, and T which are total charge for the transition, time between the starting point of the triangle and the input transition point, time measured from the starting point of the triangle to the point where the current is maximum, the total length of the time of the triangle, respectively, and each one of Q, T0, Tr, and T being a function of VDD to 2nd order and input slew time and output loading up to the third order.

According to another aspect, a voltage drop analysis tool according to the invention provides a method of pre-characterizing power and ground currents for complex cell and set up time of sequential cell etc. which has more than one internal transitions during simulation by decomposing the cell into several gates and using several triangles for modeling and reporting them to the users.

According to another aspect, a voltage drop analysis tool according to the invention provides a method of calculating new clock skew which is sum of gate delays and interconnect delays considering voltage drop effect
by doing per gate basis using its effective capacitance to generate power and ground current and feed them into power and ground network to get new VDD, and then recalculating gate delay and new interconnect delay.

According to another aspect, a voltage drop analysis tool according to the invention provides a method of calculating new set up time, new hold time, and new clock to output delay for a specified path considering voltage drop effect.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such.

Further, the present invention encompasses present and future known equivalents to the known components referred to herein by way of illustration.

As set forth above, the issue of voltage drop effect on static timing analysis has been addressed before. However, this problem becomes even more complicated if the circuit has multi-phase sequential elements. Besides, functional dependence due to supporting the signal flow along the specified path must be considered explicitly. Furthermore, modeling the power current for the set up time, hold time, and clock to output delay etc. of the sequential cell or power current of logic cell with several gates becomes essential to calculate voltage drop correctly in the critical path analysis. In stark contrast, as shown in FIG. 1, according to an aspect of the invention, a method implemented into static timing analysis and simulation tool to resolve these issues is discussed.

Figure 1:
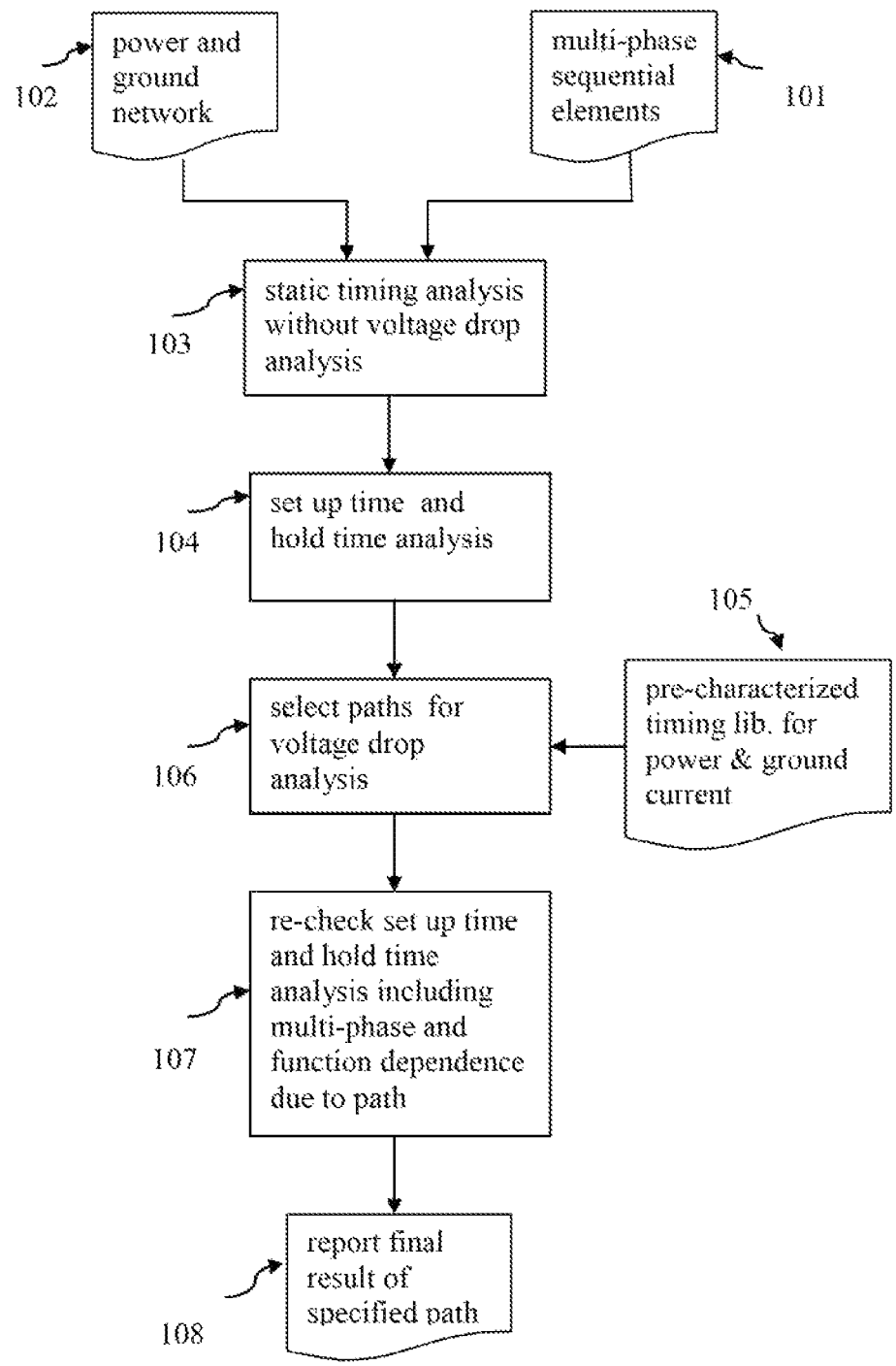
FIG. 1 is a block diagram illustrating path based voltage drop analysis according to the present invention.

In FIG. 1 a circuit description 101, which can be complicated in the presence of multi-phase sequential elements and power or ground network 102, is accepted by the tool for static timing analysis and simulation. The circuit description 101 can be at gate level, or combination of gate and transistor level, due to the fact the tool targets at hybrid design. Since the transistor level description can be partitioned into gates, the timing analysis will be handled at gate level. Our discussion for voltage drop is limited to gate level, and there is no need to specifically distinguish gate and transistor level. The front end part of this tool will recognize the contact points between circuit description and the power and ground network.

Figure 2:
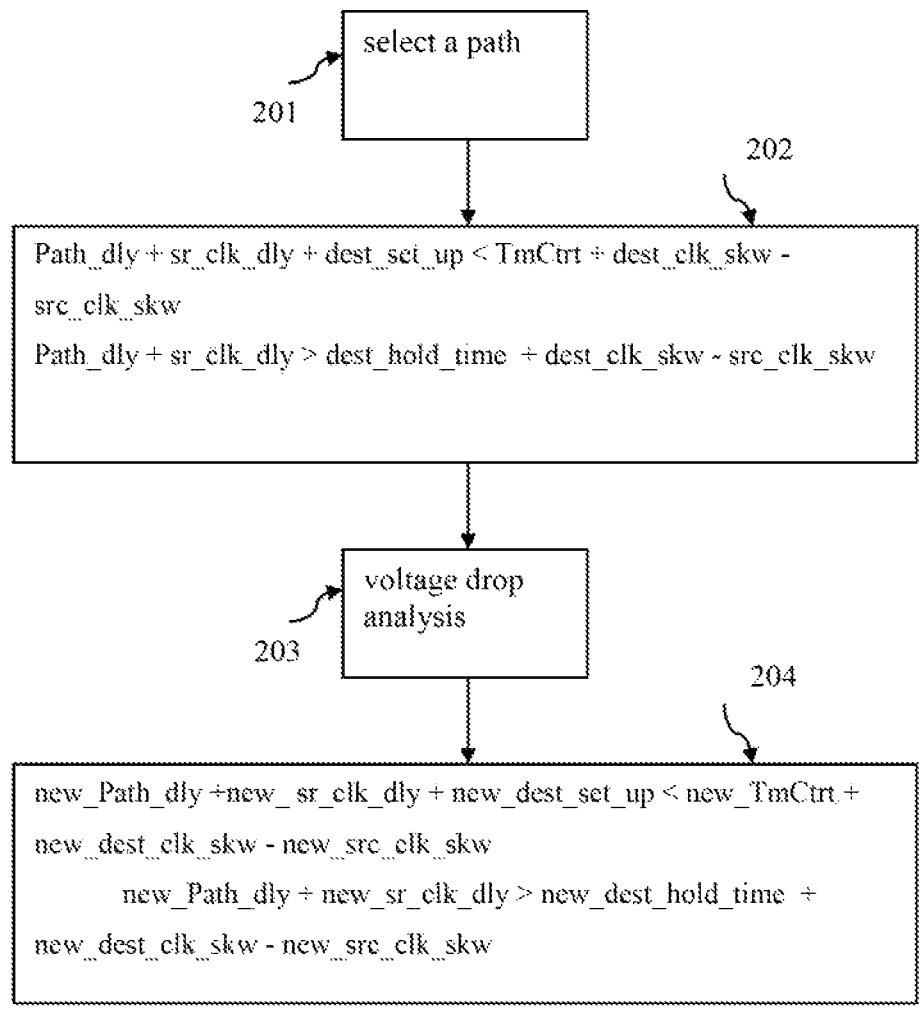
FIG. 2 is a block diagram illustrating set up time check and hold time check including voltage drop analysis according to the present invention.
Figure 3:
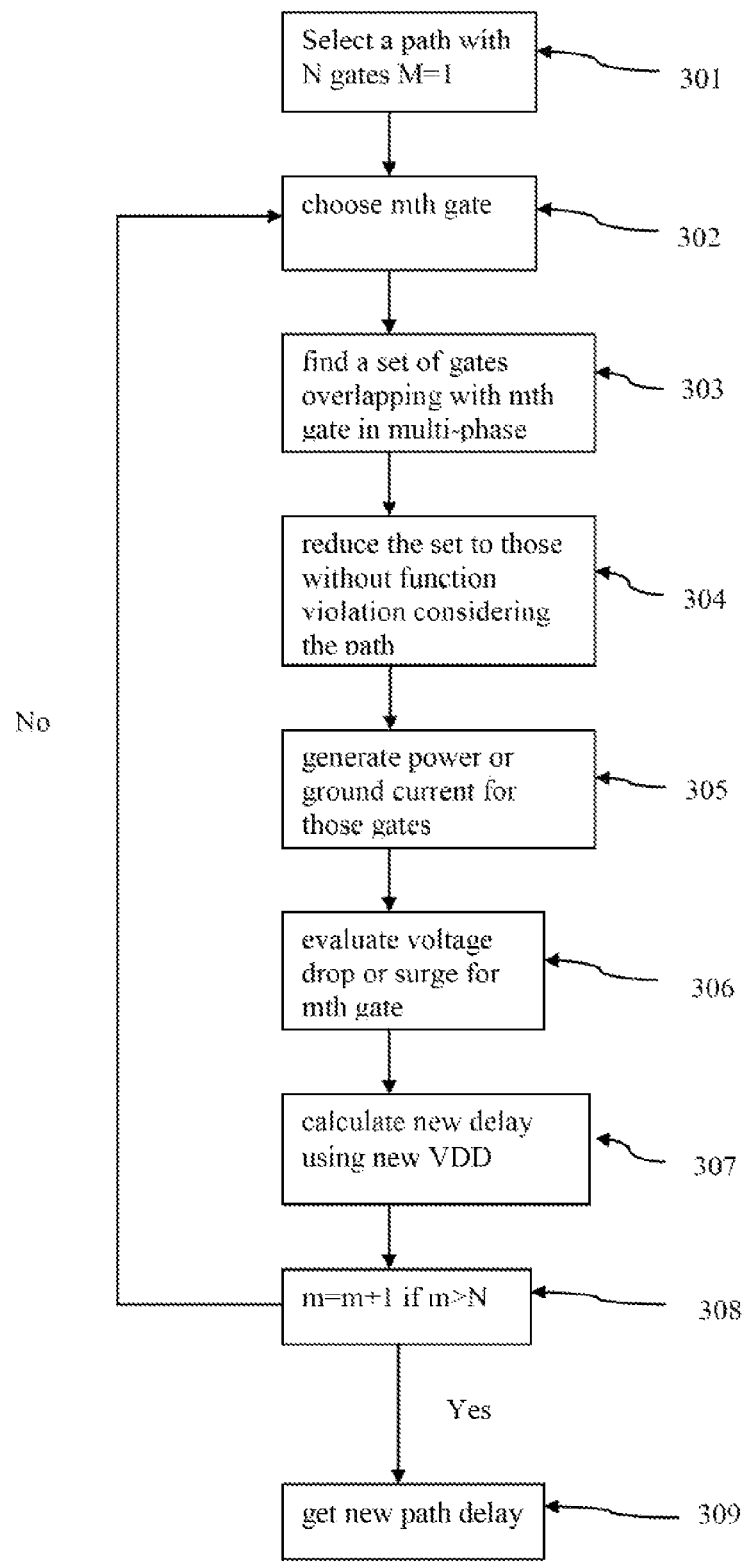
FIG. 3 is a flowchart illustrating the algorithm in calculating the new path delay by considering the voltage drop according to the present invention.

As shown in FIG. 1 static timing analysis without voltage drop analysis 103 is first used for performing both set up time and hold time check 104 to identify the failing paths, which do not meet the timing constraint, and then voltage drop analysis by utilizing pre-characterized timing library for power and ground currents 105 is performed on per path basis by specifying one path at a time 106. The basic idea is simply to re-evaluate gate delays and sum them together to get the new path delay, then compare with the new updated timing constraint to re-check set up time and hold time violations 107 and report final result for the specified path 108. The general set up time check and hold time check as shown in FIG. 2 can be stated as follows, we first select path 201 and use the formula 202 to check set up time and hold time violations, Path_dly+sr_clk_dly+dest_set_up<TmCtrt+dest_clk_skw−src_clk_skw Path_dly+sr_clk_dly>dest_hold_time+dest_clk_skw−src_clk_skw where
Path_dly=Total Path delay for a selected path
sr_clk_dly=delay from the controlling clock of source flip-flop to its output
dest_set_up=set up time for destination flip-flop
TmCtrt=timing constraint between source and destination flip-flops due to controlling clock phase relationships
dest_clk_skw=delay from the primary clock input to the clock input of destination flip-flop
src_clk_skw=delay from the primary clock input to the clock input of source flip-flop
dest_hold_time=hold time for destination flip-flop After re-evaluating the new path delay and new timing constraint including clock skew by considering voltage drop effect 203, we get 204 new_Path_dly+new_sr_clk_dly+new_dest_set_up<new_TmCtrt+new_dest_clk_skw−src_clk_skw new_Path_dly+new_sr_clk_dly>new_dest_hold_time+new_dest_clk_skw−new_src_clk_skw where
new_Path_dly=Total Path delay for a selected path considering voltage drop
new_sr_clk_dly=new delay from the controlling clock of source flip-flop to its output considering voltage drop
new_dest_set_up=new set up time for destination flip-flop considering voltage drop
new_TmCtrt=TmCtrt timing constraint between source and destination flip-flops due to controlling clock phase relationships without change considering voltage drop
new_dest_clk_skw=new delay from the primary clock input to the clock input of destination flip-flop considering voltage drop
new_src_clk_skw=new delay from the primary clock input to the clock input of source flip-flop considering voltage drop
new_dest_hold_time=new hold time for destination flip-flop considering voltage drop According to one aspect of the invention, FIG. 3 shows the flowchart in calculating new_Path_dly, the process of which includes considering the voltage drop effect in updating the delay of each gate sequentially along the specified path. Strictly speaking, the iteration process should be adopted in the following sense. First, select a specified path with N gates 301 and choose a gate along the said path 302. Our purpose in the present invention is to find a set of gates other than the said gate, especially in the multi-phase circuit, which may potentially affect the said gate in terms of voltage drop of the said gate 303. Furthermore, the present invention provides an algorithm to carry out function dependency check by considering the said path to reduce the said set of gates to a smaller one containing only those gates without function violation 304. The power currents and ground currents can be generated for those gates in the said set. Then by including the power and ground currents and power and ground network the voltage drop and surge at the contact point of the said gate are obtained 306. With new VDD for the gates new power currents are generated, causing new voltage drop and another VDD for each gate. This process, theoretically speaking, need to be iterated to achieve final convergent VDD. However, this invention only uses two-step process, namely, get power current without power network and get voltage drop from simulating the power network using the given power current as illustrated in FIG. 3 306. New delay associated with the said gate is obtained 307. We do it gate by gate 308 until all gates along the said path have been exhausted and generate the new path delay by summing all the new delays of the gates 309. We believe this process should be good enough.

How to choose a set of gates affecting the new delay of the said gate along the specified path can be a difficult problem, because in timing analysis the information besides the signal propagating along the specified path is unknown, not like simulation in which all the nodes have definite voltage by giving a set of input vector. If we neglect all the other gates and consider the said gate along the path only, the voltage drop calculated for the said gate understandably is too optimistic. On the contrary if more gates than they should be are coupled together with the said gate in voltage drop calculation, the result becomes too pessimistic. This invention proposes a method which chooses reasonably many gates and provides a reasonable upper limit of the voltage drop of he said gate, thus generating more correct new gate delay and new_Path_delay.

Referring back to FIG. 3, The criterion in selecting the gates is that the window of transition of each of the gates overlaps with that of the said gate along the chosen path 303. According to one aspect of invention, a correct way of choosing these gates in multi-phase sequential circuit is proposed 303. To decide whether the transitions of the two gates have overlapping, one way is to use the window as the delay of the transition from input to output of the gate. Another way is to find the power current for those two gates and check if they overlap. Here we use the adopt the first way to define window representing the delay, since by doing this way the power currents for both gates normally also overlap.

Figure 4:
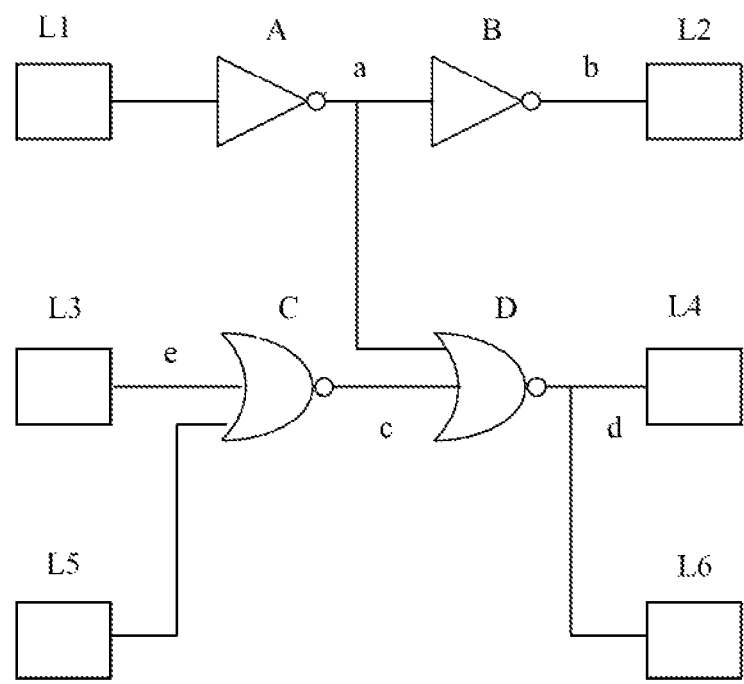
FIG. 4 is an example circuit for illustrating the concept of how to choose gates with their transitions overlapping with that of the gate along the specified path in the presence of multi-phase sequential elements.
Figure 5:
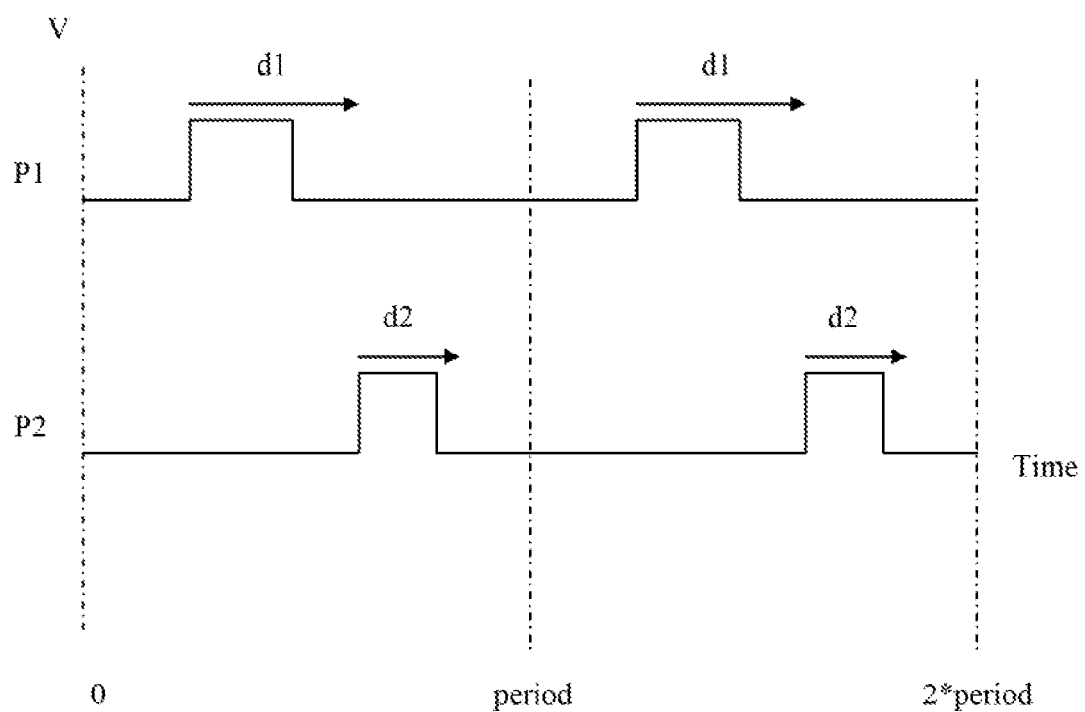
FIG. 5 illustrates an example timing diagram for several clock phases.

FIG. 4 shows the concept of how to choose gates with their transitions overlapping with that of the gate along the specified path in the presence of multi-phase sequential elements. First the algorithm for storing arrival times of multi-phase circuit without considering voltage drop effect is explained still by referring to FIG. 4. The clock phases P1 and P2 are shown in FIG. 5. The first case is that assuming L3-L6 are positive edge-triggered flip-flops, L3 and L4 are controlled by the rising clock edge of clock phase P1, while L5 and L6 are controlled by the rising edge of P2. In static timing analysis without considering voltage drop effect the latest and the shortest arrival time from the occurrence of triggering edge at each node are stored using breadth first search method. The difficulty arises if the circuit has several clock phases as shown in FIG. 5. At node c which is the output of gate C, there are two arrival times d1 and d2 from L3 and L5, respectively. In fact d1 and d2 are partial path delays where d1 is the delay for the signal propagating from L3 to node c and d2 measures the delay from L5 to c. If these two partial paths end at the destination L4 controlled by the rising clock edge of clock phase P1, according to FIG. 5, the latest arrival time is d2 from the rising edge of P2. However, if the same two partial paths from L3 to c and from L5 to c, respectively reach L6, P2 then is in front of P1 and d1 from the rising edge of P1 is considered to be later than d2 from the rising edge of P2. Therefore, d1 from the rising edge of P1 should be stored. This explains that node c must store two arrival times from P1 and P2, respectively. The second case is that still assuming L3-L6 are positive edge-triggered flip-flops, the driving flip-flops L3 and L5 are controlled by the rising clock edge of clock phase P1 and the rising clock edge of clock phase P2, respectively, while the driven flip-flops L4 and L6 are controlled by the rising edge of P2. Similar to the argument in the first case, if L4 is the destination flip-flop for both of the paths with their partial paths intersecting at node c, P1 must be in front of P2 by referring to FIG. 5. Likewise, for path ending at L6, P1 is also in front of P2. This means the ordering of P1 and P2 is fixed at node c. Therefore, in this second case, the partial path delays from L3 to node c and from L5 to node c with respect to P1 and P2 are stored into node c in terms of one clock phase P1 or P2, but in the first case these two partial path delays, namely, from L3 to node c and from L5 to node c, must be stored with respect to P1 and P2, respectively.

There is some difference in terms storing partial path delay between static timing analysis without voltage analysis and static timing analysis with voltage analysis. Without voltage analysis we only need the latest and the earliest arrival times, while with voltage analysis we need to store all delays including latest and earliest arrival times. If we only keep the latest and the earliest arrival times at each node considering voltage drop analysis, then the uncertainty window defined from the earliest arrival time to the latest arrival delay time can be rather large, increasing the chance of selecting the gate in determining overlapping and causing too pessimistic result. If we store all discrete arrival times at each input node of a gate, then each one of them form a small window with the input to output delay of the said gate. This small window makes it less likely to include this gate in the evaluation of power current, getting a tighter upper bound for voltage drop value than in the case using bigger window. In this invention the arrival times are stored in each node with respect to several clock phases. To prevent this number of arrival times from exploding in the process there is a fixed limit of arrival times for each clock phase. When the number of arrival times exceeds the fixed limit, then the new one will be merged with the closest arrival time to form a window.

Figure 6:
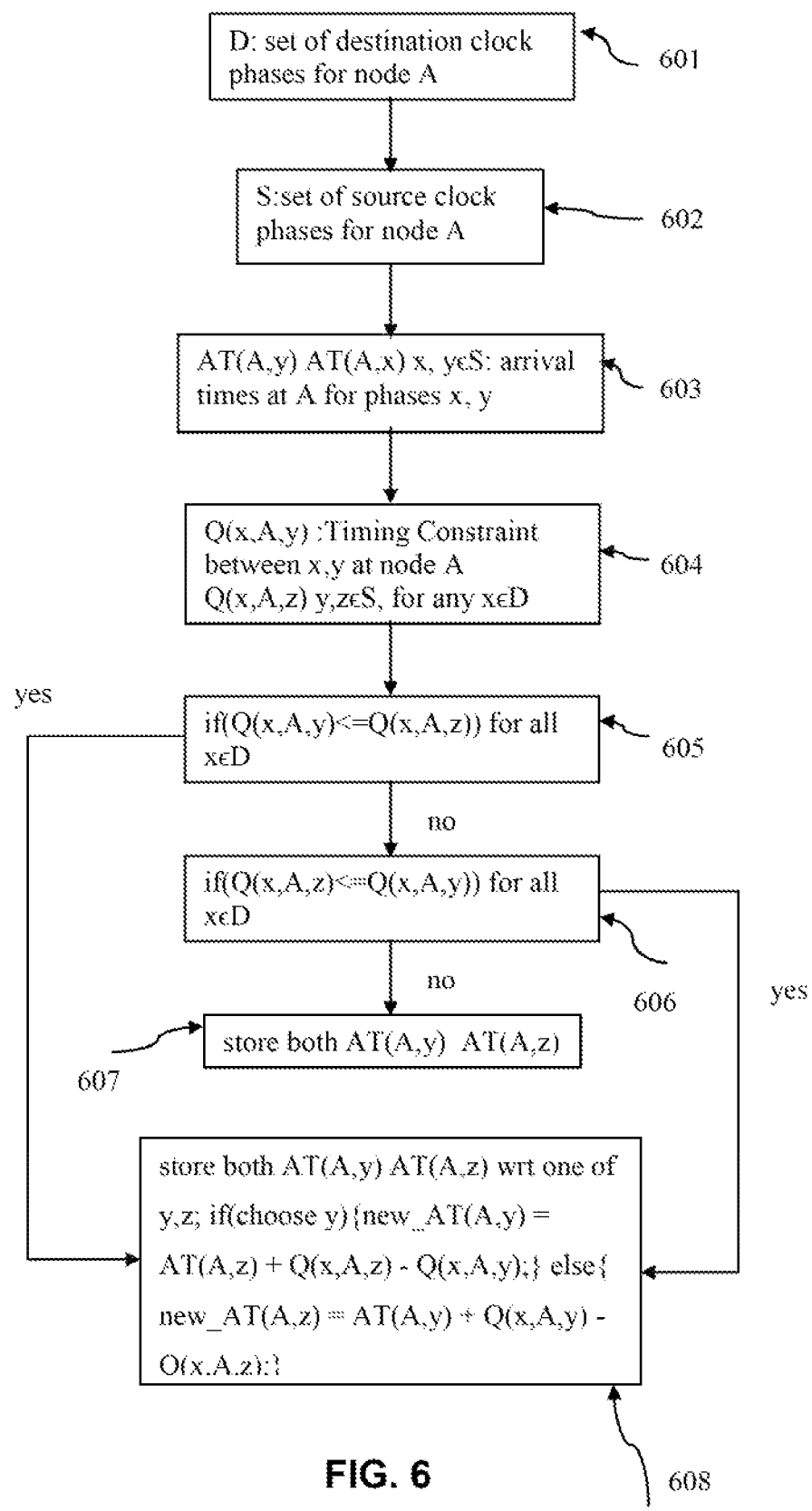
FIG. 6 is a flowchart illustrating a method to store all arrival times with different clock phases according to the present invention.

This invention presents an algorithm in storing all arrival times with different clock phases as shown in FIG. 6. Similar to timing analysis without voltage drop effect, prior to path analysis at each node a set D of the driven clock phases for its destination memory elements are identified 601. During the process of path analysis using breadth first search method, the arrival times at each node can come from different clock phases of the source flip-flops and these clock phases form a set of source clock phases, say S 602. The arrival time at node A from clock phase x, y are denoted by AT(A,x) and AT(A,y), respectively 603. We define the value Q(x, A, y) for node A with respect to a source clock phase y∈S and a destination clock phase x∈D as Q(x,A,y)=TimingConstraint(x,y), where TimingConstraint(x,y) is a timing constraint between source clock phase y and destination clock phase x. Q(x,A,z) is defined similarly 604. At node A for any pair of y and z where y,z∈S if Q(x,A,y)<=Q(x,A,z) for all destination clock phase x∈D 605, then y and z at node A has fixed ordering in the timing diagram for the clock phases as shown in FIG. 5. In this case z is in front of y. Similarly, if Q(x,A,z)<=Q(x,A,y) for all destination clock phase x∈D 606, then y and z at node A has fixed ordering in the timing diagram for the clock phases as shown in FIG. 5. In this case y is in front of z. If none of the above two conditions are satisfied, then y and z are considered to have no ordering. When y and z have fixed ordering we must choose either y or z to store AT(A,y) and AT(A,z) 608. If we choose, say y, then AT(A,z) must be transformed to be new_AT(A,y) in terms of clock phase y, where new_AT(A,y)=AT(A,z)+Q(x,A,z)−Q(x,A,y);

If we choose z, then AT(A,y) must be transformed to be new_AT(A,z) in terms of clock phase z, where new_AT(A,z)=AT(A,y)+Q(x,A,y)−Q(x,A,z);

As to the case in which y and z have no ordering, both AT(A,y) and AT(A,z) must be stored as they are 607.

Figure 7:
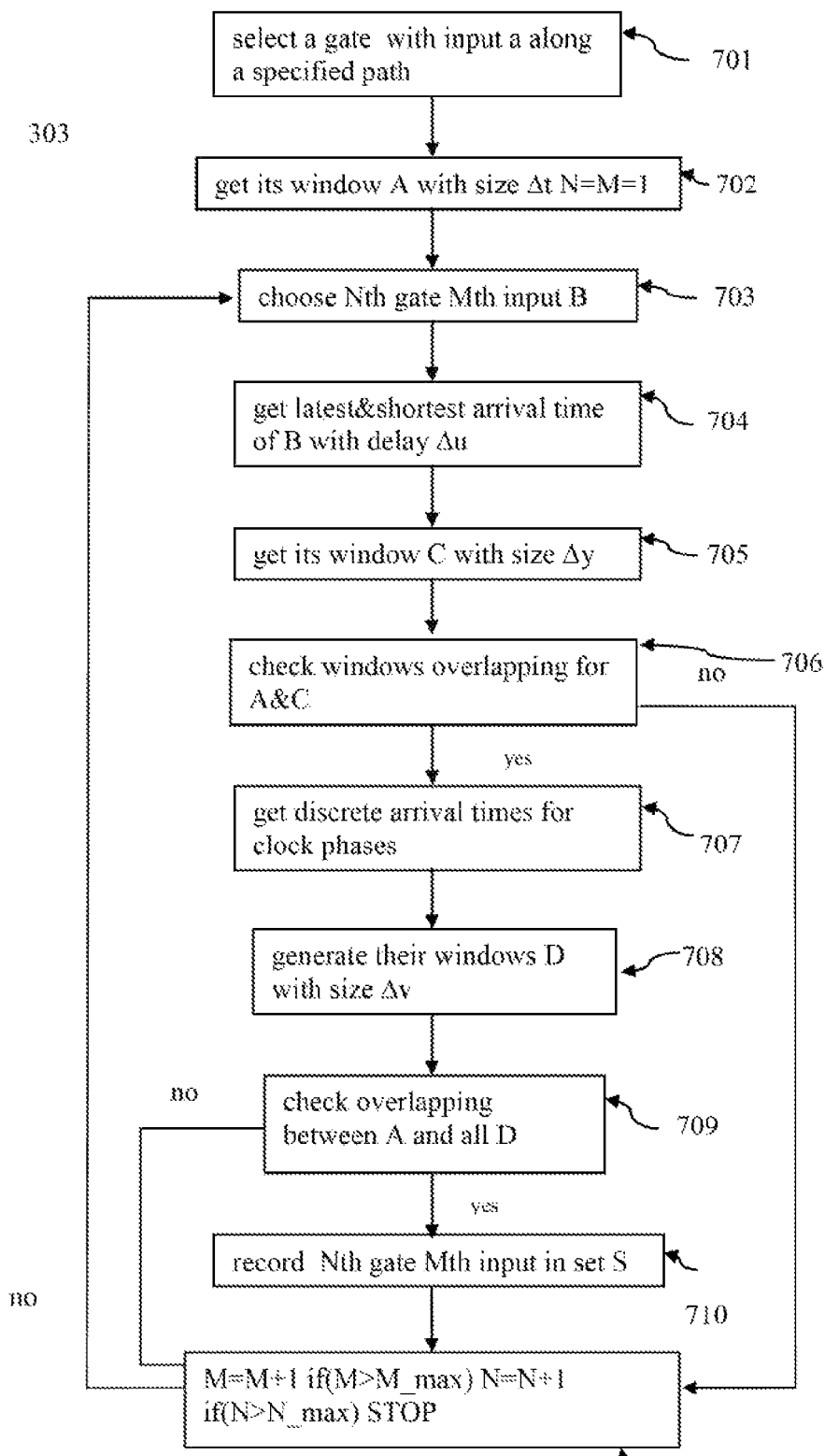
FIG. 7 is a flowchart illustrating the preferred algorithm of selecting the gates and their inputs with their transitions overlapping with that of one gate with its input in the specified path according to the present invention.

Referring back to FIG. 3 the algorithm used in this invention of selecting the gates and their inputs with their transitions overlapping with that of one gate with its input in the specified path 303 is further described in the flowchart in FIG. 7. We start with one selected gate with one input along the specified path 701. The window A has size Δt which is the delay from the said input of the said gate to the output of the said gate 702. Check all gates of the circuit one by one. We start with one input node, say B 703 and consider all the clock phases stored in B. The discrete arrival times and/or several discrete uncertainty windows for the arrival times have been stored into each node plus the latest and the earliest arrival times with respect to different clock phases 704. The said latest and the earliest arrival times shifted by the delay Δu from node B to the output of the driven gate of node B for one clock phase forms another window, say C with size Δy 705. If there is not any overlapping between A and C for their own clock phases 706, we can immediately skip this node B and go to next node 711. By doing this way, namely, filtering lots of nodes which make no contribution at all for power current can save substantial CPU. The criterion of overlapping between two windows in multi-phase circuit will be discussed later. Here if we do find a node which potentially can contribute the voltage drop of the said gates by first checking the latest and shortest arrival times, we then get the discrete arrival times of this said node with respect to clock phases 707, generate a window D with size Δv 708 for each of the discrete arrival times and check if A and D overlaps. In case none of the discrete arrival times with window D overlaps with A 709, this node is skipped and go to next node 711. If we do find one discrete arrival time of node B, record B into set S 710 and go to next node 711. Finally we get a set S of gates and their inputs with their transitions overlapping with that of the chosen gate along the specified path.

Figure 8:
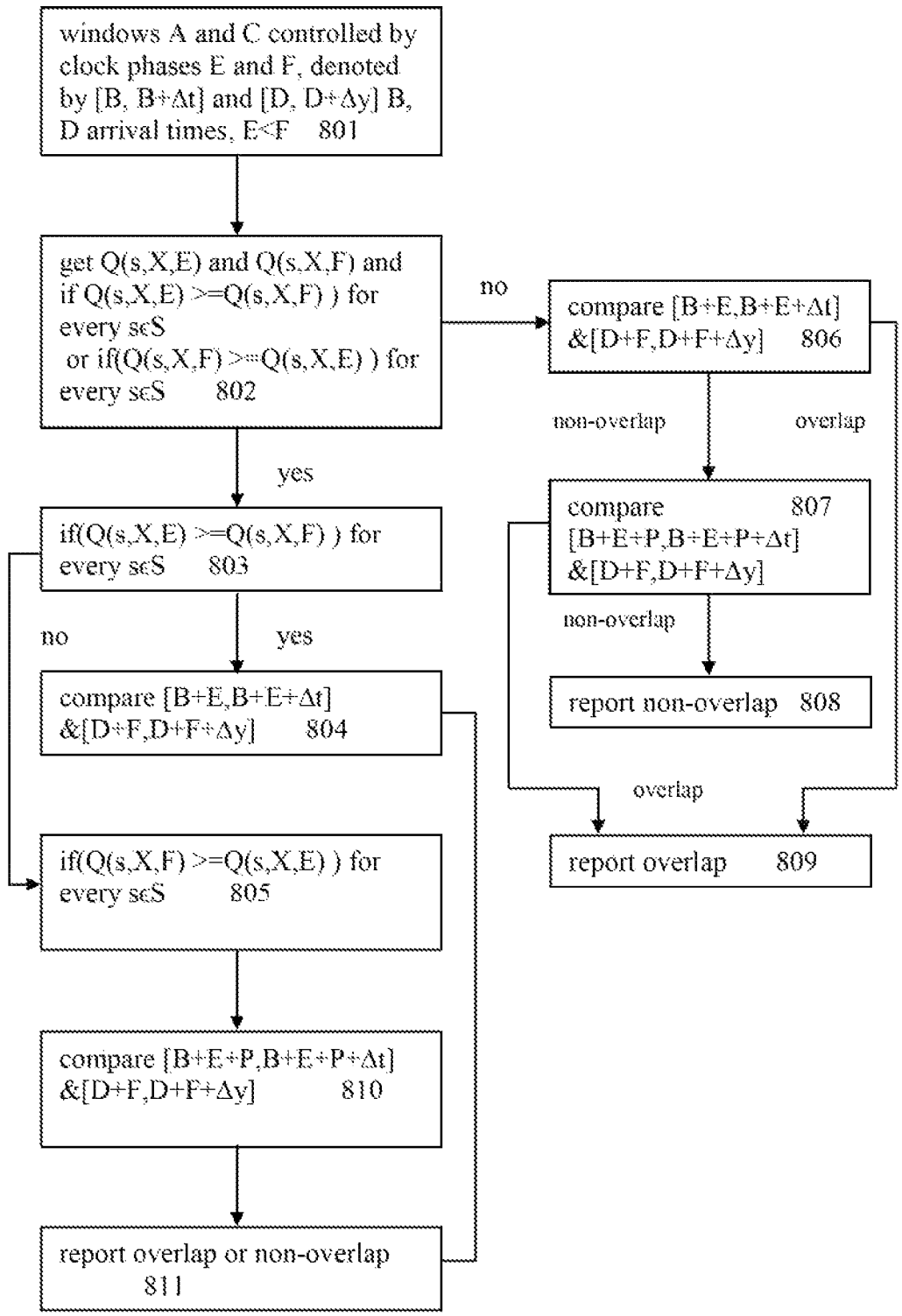
FIG. 8 is a flowchart illustrating a method to determine whether two timing windows from different clock phases overlap according to the present invention.

According to one aspect of this invention, FIG. 8 shows how to determine overlapping of two timing windows A and C controlled by clock phases E and F, respectively. The window A comes from node Z driving the gate Y with its output X and delay $\Delta t$ from Z to X. The window C comes from node L driving the gate N with its output M and delay $\Delta y$ from L to M. We form a set S for all of the destination clock phases for X and M. Let the window A be denoted by [B, B+$\Delta t$] in which B is the stored arrival time at node Z measured from the time when E occurs and $\Delta t$ is the window size. Similarly, window C is denoted by [D, D+$\Delta y$] in which D is the stored arrival time at node L measured from the time when F occurs and $\Delta y$ is the window size 801. The clock phases E and F are expressed within one clock period and without confusion and the occurrence time for E or F is also denoted by E or F, respectively. Since clock phases E and F are different, we need to find out if E and F have some fixed ordering. Let us assume in the timing diagram within one clock period E<F 801. Similar to the discussion in FIG. 6, we calculate Q(s,X,E) and Q(s,X,F) and if Q(s,X,E)>=Q(s,X,F) or Q(s,X,F)>=Q(s,X,E) for every s$\in$S, then E and F have fixed ordering 802. In case it is Q(s,X,E)>=Q(s,X,F) for every s$\in$S 803, the clock phase E occurs earlier than F, but in the timing diagram within one clock period E may be after F. If so, F needs to be added up by one clock period. Therefore, we end up in checking both windows [B+E+P,E+P+$\Delta y$] and [D+F,F+$\Delta t$] where P is the clock period. Note that we have included B and F in the two windows so that both windows are measured from the common point. In case F is after E in the clock phase representation within one clock period, then simply check [B+E, B+E+$\Delta y$] and [D+F, D+F+$\Delta t$] 804 and report non-overlap or overlap 811. If we have Q(s,X,F)>=Q(s,X,E) 805 for every s$\in$S, similar discussion is followed and there is no need to repeat it 810. In case the condition, namely, if Q(s,X,E)>=Q(s,X,F) or Q(s,X,F)>=Q(s,X,E) for every s$\in$S, is not satisfied 802, then there is no fixed ordering of E and F, and both cases E>F and F>E are allowed. Let us say E>F in the clock phase representation within one clock period. To measure both windows A and C from the common point, we have [B+E,B+E+$\Delta t$] and [D+F,D+F+$\Delta y$]. Then we can check if these two windows overlap 806 and report overlap if these two windows overlap. If both [B+E,B+E+$\Delta t$] and [D+F,D+F+$\Delta y$] don't overlap, we need to do one more check. Since there is no ordering between E and F, F can occur before E. We have assumed that E>F, then we need to shift one clock period to make F happen before E, ending up with the two windows [B+E,B+E+$\Delta t$] and [D+F+P,D+F+P+$\Delta y$] where P is the clock period. We then check if these two windows overlap 807. If for both of the possible window arrangements none of them have overlapping, then we have determined that the windows A and C are non-overlapping and report non-overlap 808.

Figure 9:
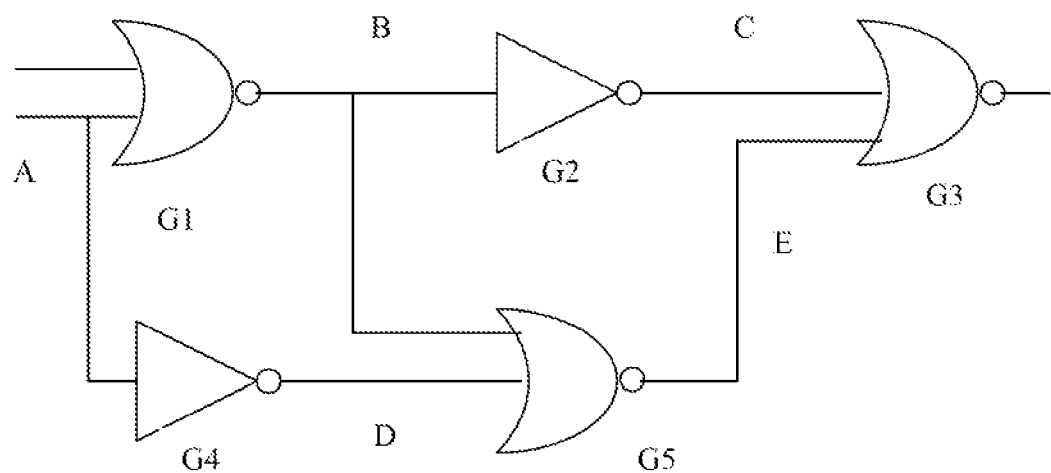
FIG. 9 is one example circuit for illustrating that the side input of gate along the path must have the logic value RISE or FALL.

Another aspect of the invention is to use functional dependency to support the signal propagation along the specified path as illustrated in FIG. 4. The concept is that the nodes along the specified path have definite logic values like RISE and FALL etc. and the side inputs of the gates along the specified path must have the logic values to allow the signal to pass through the gate. As shown in FIG. 4 the specified path starts from node e which is output of L3, passing through gate C and its output c, followed by another gate D and node d, ends at L4. The nodes along the path such as e, c, d etc. have RISE, FALL, RISE values. However, the side input can have either a static logic value like VDD or GND or a dynamic value like RISE or FALL. For example a two input NAND gate is along the specified path with the first input along the path having RISE value. Then the second input must be VDD or RISE to let the input signal RISE to become FALL at the output. Referring back to FIG. 4, node a is the side input of gate D as far as this path is concerned. Since the signal at node c is FALL, in order to support the signal to propagate from c to d which has logic value RISE, the side input a must be either GND or FALL. In real circuit most likely this side input is VDD or GND and the gate delay is evaluated based on only one input changing. In case we allow all the side inputs to be changing, there will be many gates besides those along the specified path which potentially need to be considered in calculating the voltage drop of one gate along the specified path, making the result more pessimistic than it should be. Besides, by considering all side inputs changing the delay and power current computed from pre-characterized library are not valid anymore, since all pre-characterized results are based on only one input changing. However, there are cases in which the side input must be changing. FIG. 9 is one example in which the side input E of gate G3 is correlated to the signal A along the path and E must have the logic value RISE, if the signal at A is RISE. If the side input cannot be identified to changing like RISE or FALL, then it is reasonable to treat it having a fixed logic value like VDD or GND depending on the type of logic for the gate.

Figure 10:
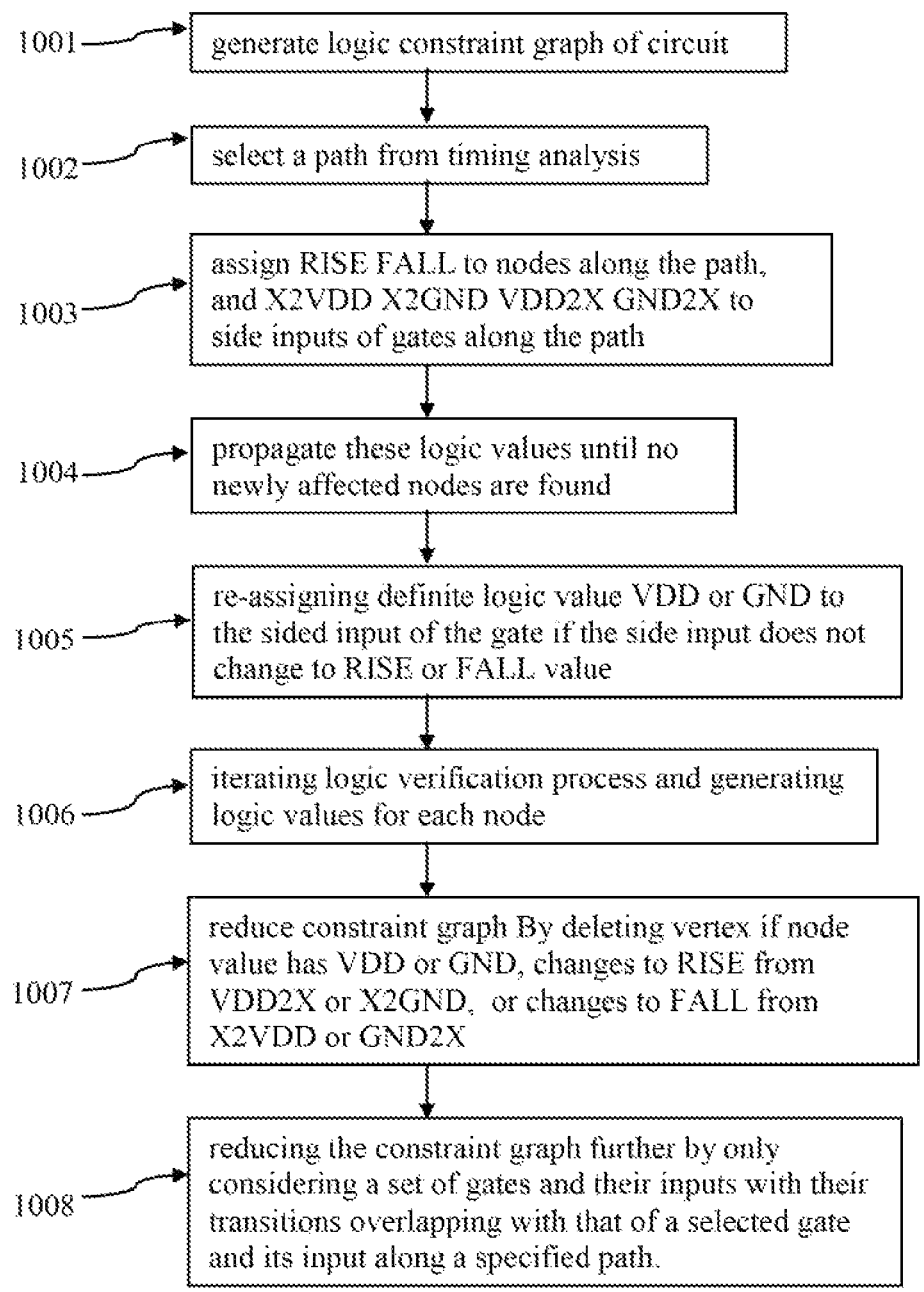
FIG. 10 is a flowchart illustrating the preferred algorithm of function dependency check according to this invention.

Referring back to FIG. 3 the algorithm of function dependency check in this invention 304 is explained in the flowchart in FIG. 10. Initially the standard procedure by Bobba etl. is adopted to generate the logic constraint graph of the circuit with each node being represented by two vertices for rise and fall transition and each edge representing the constraint 1001. For a specified path 1002 we then need to find out whether the side input should be assigned a static VDD or GND or a changing value like RISE or FALL. We carry out the logic violation check to obtain the logic values at the nodes. In order to achieve this we first assign RISE or FALL value for the nodes along this specified path. As to side input we assign X2VDD (UNKNOWN TO VDD), VDD2X (VDD TO UNKNOWN), X2GND (UNKNOWN TO GND), or GND2X (GND TO UNKNOWN) etc. 1003. For example, for 2-input NAND if first input is RISE, then 2nd input becomes X2VDD. Propagate each of these said nodes with the given initial node value to its fan-in and fan-out gates and check their input and output nodes. If some node is affected, namely, the node value gets changed, then keep checking from this node and so on until no newly affected node is found 1004. After the process is done, if the side input has already changed to RISE or FALL, then we don't need to do any further. However, if the side input still has the originally assigned value such as X2VDD etc., then we need to change it to static value like changing X2VDD to VDD etc. 1005 and perform the logic verification process again by resetting the initial value to UNKNOWN for all nodes except those along the specified path and the side inputs of all gates along this path 1006. After this logic verification process is done for the second time, the node may have either one of UNKNOWN, VDD, GND, VDD2X etc, RISE, and FALL. If the node has VDD or GND, meaning this node is not allowed to make a transition, we can safely discard vertex corresponding to this node in constraint graph, since the vertex of this graph only deals with rise or fall transition. For VDD2X or X2GND, we can only allow it to change to FALL, therefore, the vertex for this node with RISE value should be deleted. Similarly, for X2VDD or GND2X, the vertex for this node with FALL value should be deleted 1007.

Still referring to FIG. 10, the aforementioned constraint graph can be reduced even further by only considering set of gates obtained previously which need to be coupled with the selected gate in the specified path in getting the power currents 1008. As to how to how to find a maximum independent set of vertices, there are quite a lot literature discussing various kinds of heuristic algorithms, so they are not addressed in this invention. The evaluation of power currents is then followed after the final maximum independent set of vertices is obtained.

In this invention some special algorithm for pre-characterizing power current of gate, logic cell consisting of several gates, and pre-characterizing set-up time, hold time, and clock to output delay etc. of sequential cell for the timing library is discussed. the power current for the gate, cell, sequential element are discussed.

Figure 11:
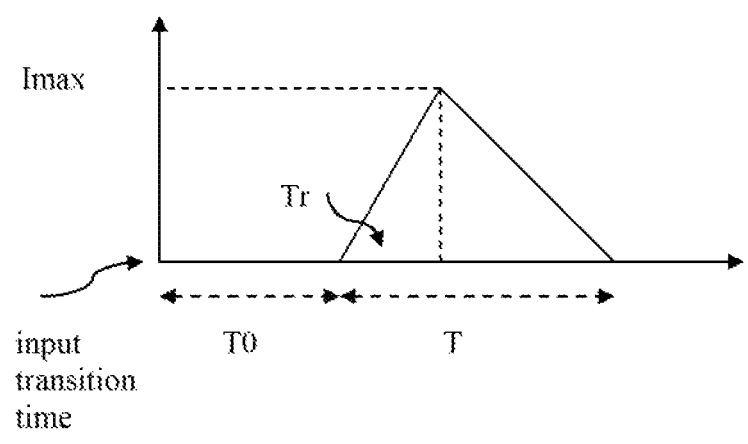
FIG. 11 is one example for illustrating the modeling of power or ground current in terms of a triangle with parameters Imax, Q, T0, Tr, and T etc.

FIG. 11 illustrate the modeling of power current. Power current flowing into gate at the contact point and ground current flowing out of the device into the ground network are modeled in terms of one triangle being expressed by Q, T0, Tr, and T which are total charge for the transition, time between the starting point of the triangle and the input transition point, time between the starting point of the triangle to the point where the current is maximum, the total length of the time of the triangle, respectively. The maximum height of the triangle Imax is 2*Q/T. Similar to delay and slope, these quantities such as Q, T0, Tr, and T etc. for one triangle are also a function of input slew time, and output loading, and modeled for one triangle up to cubic order as, $$X = \left(\sum_{i=1}^{5} f(i)Y(i)\right) + Vdd\left(\sum_{i=1}^{5} g(i)Y(i)\right) + (Vdd)^2\left(\sum_{i=1}^{5} h(i)Y(i)\right)$$

where X refers to Q, T0, Tr, or T

Y(1)=slew_time  Y(2)=out_load*slew_time  Y(3)=(out_load)$^3$

Y(4)=out_load Y(5)=1

Figure 12A:
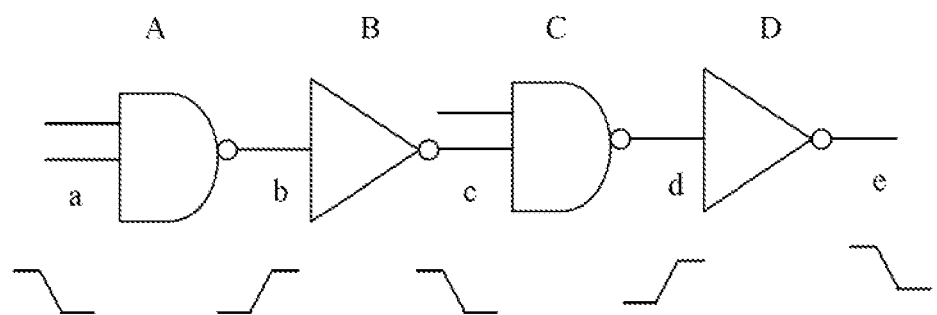
FIG. 12A is an example circuit of a cell grouped into several gates illustrating the modeling of power and ground currents in terms of several triangles.
Figure 12B:
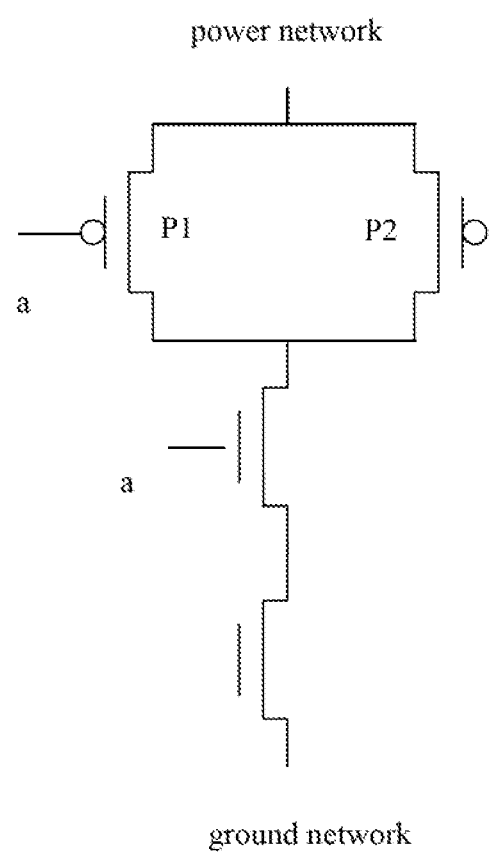
FIG. 12B is transistor level description of one gate labeling the transistors connected to the contact point.
Figure 13:
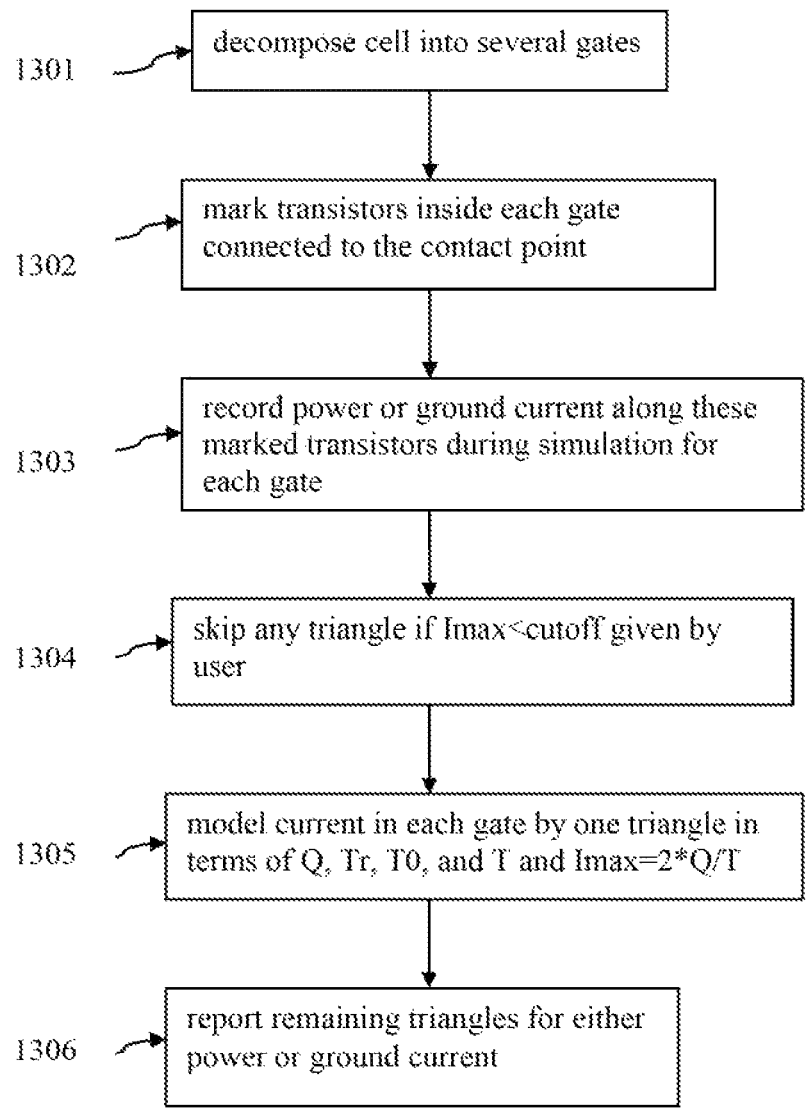
FIG. 13 is a flowchart illustrating a method to pre-characterize power and ground current for the cell in terms of several triangles.

All f g and h are empirical fitting coefficient;

Another aspect of the invention is the modeling of power or ground current of cell including several gates. A hypothetical simple example of a cell with one contact point for each of power and ground networks is as shown in FIG. 12A and the transistor description of one gate is described in FIG. 12B. If input a of the cell falls, then output e of the cell falls. However, inside the cell, each of the four gates experiences its transition at different times with its own power current modeled by a triangle. Gates A and C contribute power currents which should be modeled by two separate triangles. Obviously in pre-characterizing the power current if the data is fitted into one triangle result is wrong. Sometimes the multiple triangles tend to overlap with themselves. Therefore, the data cannot be simply fitted by several triangles. In this invention the pre-characterization step as shown in the flowchart of FIG. 13 is performed by the tool which decomposes the cell at transistor level into several gates 1301 such as A, B, C, and D in FIG. 12A. Besides, the transistors inside each gate connected to the contact points are marked 1302. Referring to FIG. 12B the transistors such as P1 and P2 connected to the contact points for each gate like gate A are recognized, and the power and ground currents flowing into and out of the gate, respectively, can be evaluated by summing the currents through these transistors connected to the contact points. Thus, during simulation the power or ground current flowing through each gate is recorded as a function of time 1303, and after the simulation is done the data of the power or ground current for each gate is modeled separately by its triangle in terms of Q, T0, Tr, and T 1304. Some gate may have short-circuit power current which is small, not making noticeable effect on voltage drop. We skip reporting these power current. For example, a gate makes a rise transition, but there is some ground current or the short-circuit current associated with the gate. There is no need to report this short-circuit current as far as voltage drop calculation is concerned. So in actual implementation a cutoff power or ground current is given and if the triangle with Imax<cutoff below, then it will not be printed out 1305. The final result reported to the user of the tool will contain several triangles in terms of its own Q, T0, Tr, and T 1306.

The same discussion above can be applied to the modeling of power and ground current for the sequential element including set up time, hold time, and clock to output delay etc. By referring to FIG. 14, in set up time pre-characterization the data signal data passes through several gates to the point set_up_point where set up time is measured. Likewise, the sequential element at transistor level is decomposed into several gates and current for each current is recorded. Similarly, as shown in FIG. 13 some triangles are not reported if Iax<cutoff as provided by the user.

Figure 14:
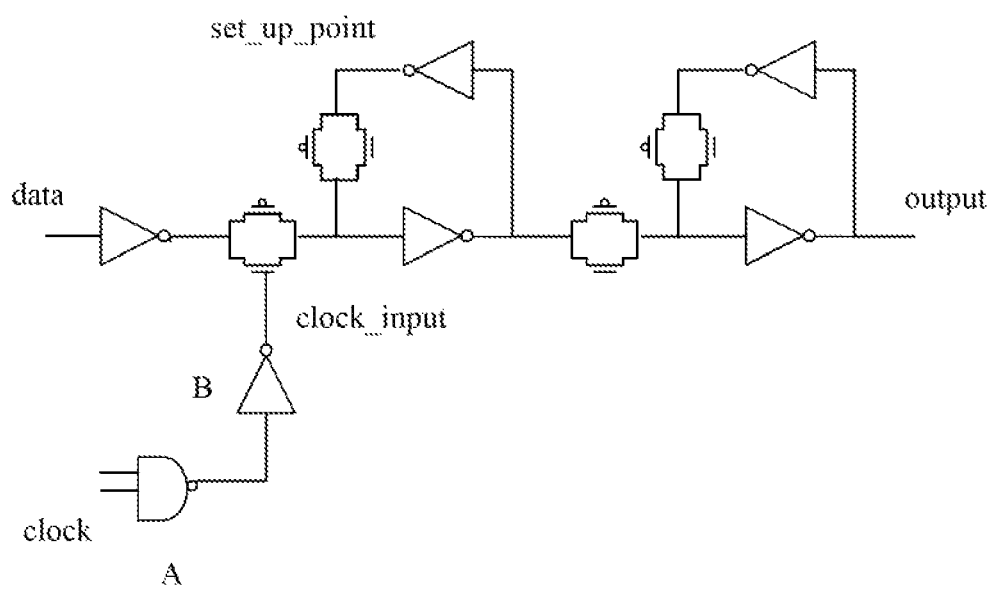
FIG. 14 is an example sequential cell further illustrating the modeling of power and ground currents in terms of several triangles and illustrating the preferred method in handling clock skew analysis by including voltage drop effect according to the present invention.
Figure 15:
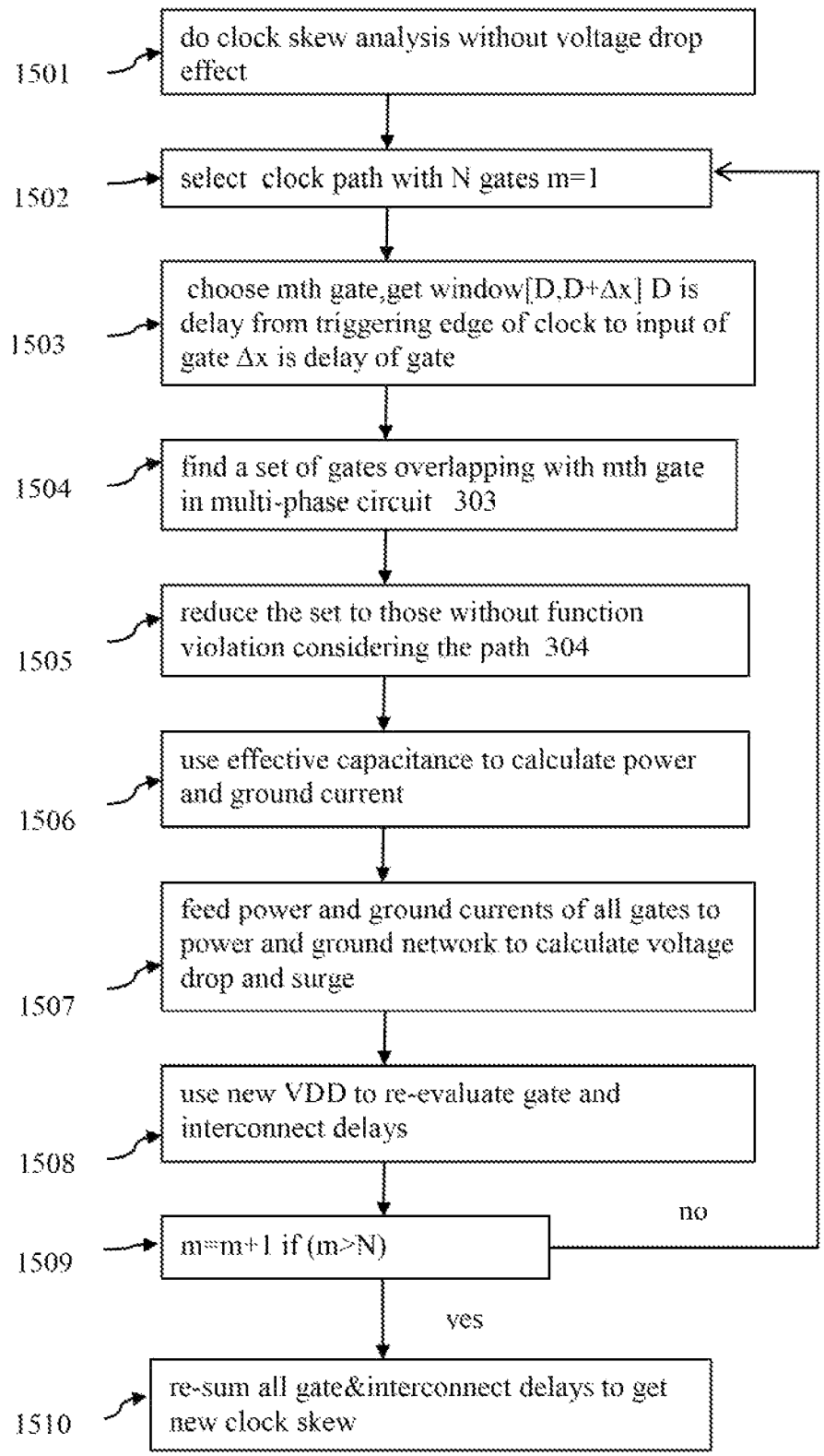
FIG. 15 is a flowchart illustrating the preferred algorithm of clock skew analysis considering voltage drop effect.
Figure 16:
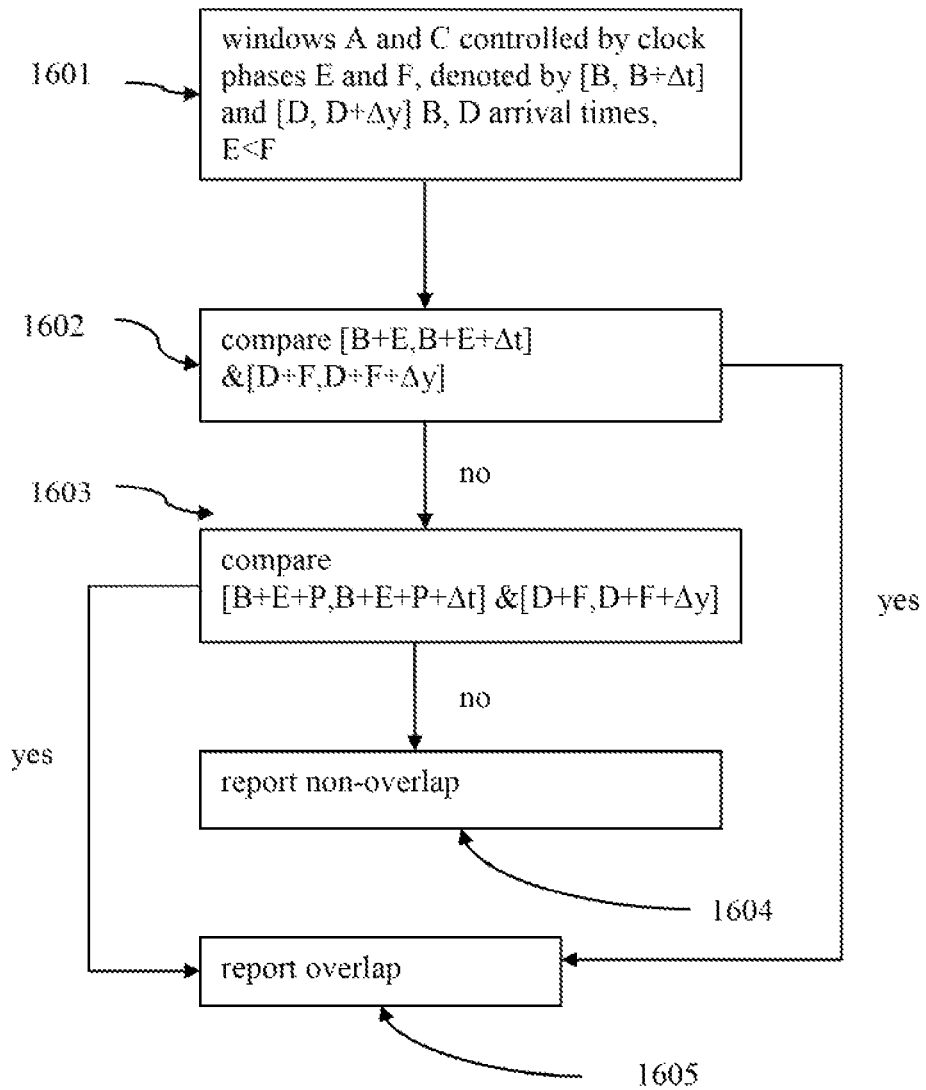
FIG. 16 is a flowchart illustrating a method to determine whether two timing windows from different clock phases without fixed ordering overlap according to the present invention.
Figure 17:
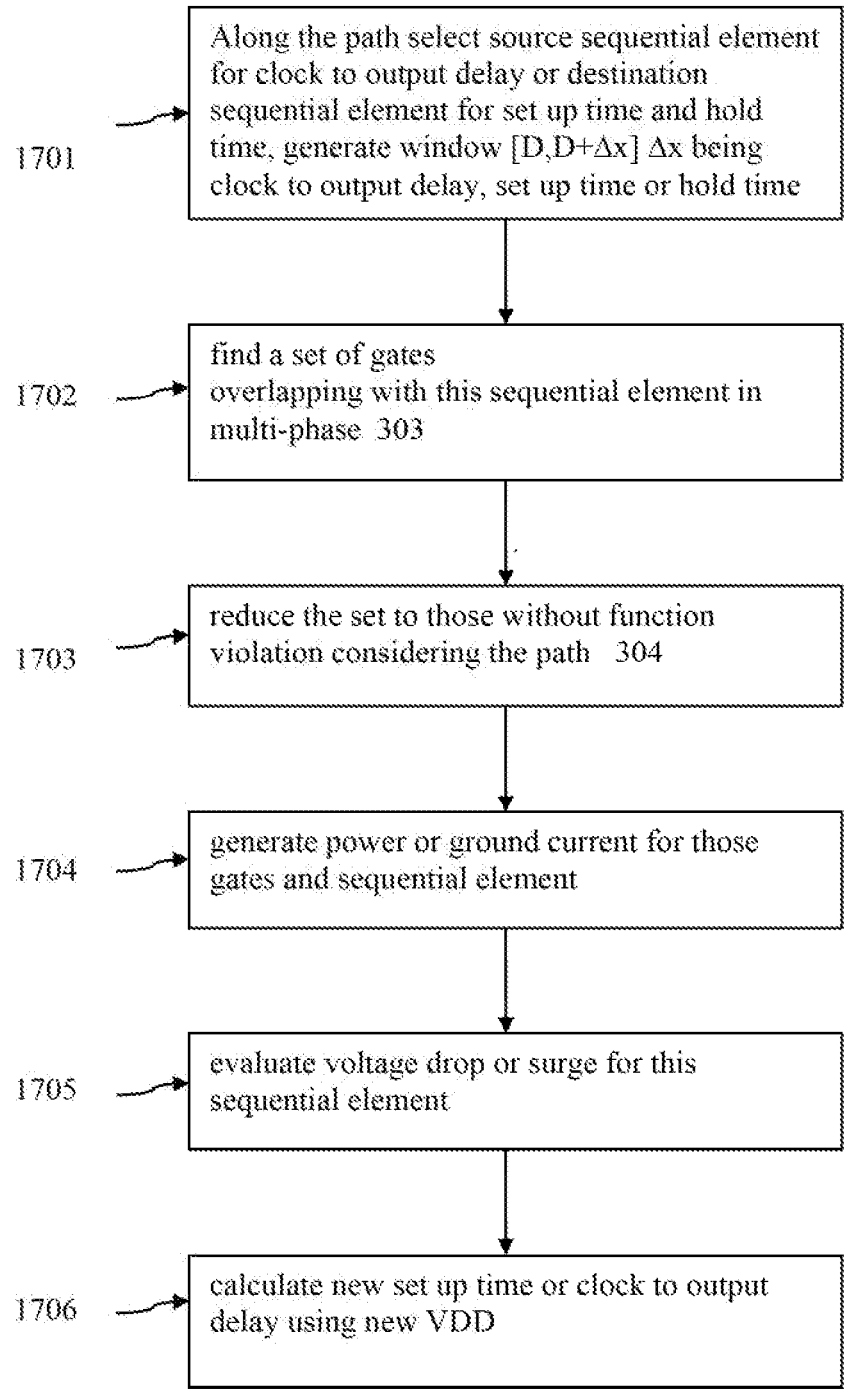
FIG. 17 is a flowchart illustrating the algorithm in calculating the new set up time, hold time and clock to output delay of the sequential cell for a specified path by considering the voltage drop according to the present invention.

By referring to FIG. 2, this invention also provides a way to re-calculate the clock skew src_clk_skw which is essential in performing timing check. Clock skew analysis detects the path consisting of the gates the clock signal traverses from primary clock input to the clock input of the sequential cell and the clock skew is obtained by calculating the path delay. As shown in FIG. 14, clock signal clock passes through gates A and B with clock skew as the sum of the delays for A and B. Certainly there are different interconnect delays from output of B to various flip-flops. We ignore these interconnect delays since we separate them from gate delays by using well-known effective capacitance for each gate. Theoretically speaking, we may find some gates with their transitions overlapping with that of some gate along the clock path in clock skew analysis. Here is one hypothetical example for multi-phase circuit by referring back to FIG. 4. Assuming L3 and L4 are controlled by clock phase P1 and L5 and L6 are controlled by clock phase P2. The clock skew for L5 is counted from the rising edge of P2 and a path passes from L3 to L4 with the arrival time calculated from the rising edge of P1. From FIG. 5, we can understand that potentially the two windows, one is from transition of a gate along the clock path and the other is due to transition of a gate along the path from L3 and L4, can overlap. The procedure of calculating clock skew in the presence of voltage drop effect is as follows. First carry out clock skew analysis without voltage drop effect 1501. Along the path 1502 which the clock traverses we select each gate one by one and define the window [D,D+Δx] with D the delay from the primary clock input to the input of the said gate along the clock path and Δx being the delay of the gate 1503. We then need to find a set of gates overlapping with this said gate in multi-phase circuit 1504. The details are described in FIG. 7 303. However, the way we handle the overlapping of two windows is different from that as described in FIG. 8. This algorithm for comparing two windows in clock skew analysis according to this invention is described in FIG. 16. The idea is that the output node of the said gate doesn't have anything to do with destination clock phases, since this node is not involved with signal propagation from source sequential element to the destination one. Thus we end up in comparing window [D,D+Δy] with another one, say [B,B+Δt] without fixed ordering for the clock phases of these two windows. Referring to FIG. 16, for the two windows [D,D+Δy] (window C) and [B,B+Δt] (window A), D and B are arrival times from clock phases E and F, respectively 1601. Without confusion the times associated with the triggering edges for E and F are also denoted by E and F, respectively, and E<F in the timing diagram within one clock period. As to E>F, the discussion is the same and there is no need to include it in FIG. 16. By measuring from the common point, we express the two windows as [B+E,B+E+Δt] and [D+F,D+F+Δy] and check if they overlap 1602. If true, then report that these two windows overlap 1604. However, if not true, due to the fact that the clock phases [B+E,B+E+Δt] and [D+F,D+F+Δy] have no fixed ordering and E<F, we still need to shift one clock period P for [B+E,B+E+Δt] and compare two windows such as [B+E,B+E+Δt] and [D+F,D+F+Δy]. If they overlap, we report overlap for windows A and C 1604. In case [B+E,B+E+Δt] and [D+F,D+F+Δy] still don't overlap, then report non-overlap for windows A and C 1605. After the step of finding a set of gates overlapping with this said gate in multi-phase circuit 1504 is done, we proceed to carry out function dependency check to generate the final set of gates and their inputs that need to be considered together with the said gate along the clock path to be considered in voltage drop analysis 1505, and the details of which have been described in FIG. 10 304. Again, the two-step approach is used. First we calculate power or ground currents for the said gate along the clock path and the said set of gates using the pre-characterized timing library. Due to the interconnect which plays an important role in clock skew analysis, the effective capacitance of the said gate is used 1506. By feeding the power or ground currents of all gates to the power or ground network and perform timing simulation to obtain the voltage drop or surge at the contact of the said gate 1507. For the said gate with newly calculated, say X, which is voltage drop or voltage surge, or maximum of voltage drop and voltage surge if both are present. Then get new VDD by subtracting X from VDD. Use this new VDD for the said gate and re-evaluate its gate delay and interconnect delay 1508. Check if all gates along clock path have been accessed 1509. If all gates along the clock path have been treated for voltage drop analysis, we sum all of the new gate and interconnect delays to generate final src_clk_skw 1510 which will then used in checking timing violations such as set up check and hold time check etc. by including voltage drop effect.

Referring back to FIG. 2 again, we still need the new_set_up and new_hold_time and new_clk_output_delay etc. The algorithm in fact is similar to that in calculating new gate delay by considering voltage drop effect as shown in FIG. 3. Here in a specified path we select the source sequential element for new_clk_output_delay and destination sequential element for new_set_up 1701. We want to find a set of gates and other sequential elements for which the transitions overlap with that of the said sequential element 1702. Some elaboration on 1702 is as follows. The transition window size for the set up time of the destination sequential element is the set up time Δx measured from the data input, say D 1701. The said node D stores destination clock phase which is the clock phase of the said destination sequential element. D also stored source clock phase which is the clock phase of the source sequential element. Besides, the arrival time is, say T at node D, then the window [T,T+Δx] is compared with those from the other gates storing their own source and destination clock phases based on the method for multi-phase circuit presented in FIG. 7 303. After the step of checking window overlapping is done 1702, function dependency check 1703, the details of which are described in FIG. 10 304, is followed. From timing library power and ground currents can be obtained in terms of several triangles 1704. Note that the sequential cell has only one contact point with the power or ground network. The power and ground currents at the only contact points for power and ground network, respectively, coupled with power and ground network are used for timing simulation to achieve voltage drop and voltage surge as function of time. We then select, say X, which is the maximum of voltage drop and voltage surge during the whole simulation time. Take VDD as VDD-X to get the new VDD 1705. Then using new VDD to re-calculate new_set_up time by applying the slew time at the data input 1706. As to new_clk_output_delay, in the specified path we need to select the source sequential element for new_clk_output_delay with the window size being the clock to output delay Δx measured from the clock input of the said sequential element. The signal arrival time at the output of the said sequential element is, say W, where W=S+Δx and S is the clock skew from primary clock input to C. Therefore, the window is then the window [W,W+Δx] and the remaining steps are identical to those for the discussion of new_set_up. The procedure of re-calculating new_hold_time basically is the same as those of new_set_up and new_clk_output_delay except that we need to choose the destination sequential element and use clock input. There is no need to repeat the same discussion here.

With all of these in place, the set up time and hold time can be checked again to ensure that the timing constraint is met. The new result in terms of timing constraint violation by considering voltage effect are then reported to the user of this tool.

In conclusion, the issue of voltage drop analysis built into static timing analysis in multi-phase sequential circuit has not been addressed before. The difficulty lies in the fact that in multi-phase sequential circuit the timing constraints for the paths in static timing analysis can be non-uniform with the arrival times stored at each node with respect to several different clock phases and also with destination flip-flops with different clock phases, rendering lots of complexity in calculating voltage drop of any gate along the critical path accurately in terms of selecting a set of gates with their power currents which affect the voltage drop of the said gate. This invention presents a special algorithm in solving the aforementioned issue. This algorithm determines whether the transition of a gate and the transition of the said gate along the said critical path potentially overlap even these transitions are with respect to different clock phases and if so, the gate is put into the said set of gates to be considered for voltage drop calculation for the said gate along the said critical path. This invention further proposes the functional check for the said critical path to reduce the said set of gates by eliminating the gates that are not to have rise or fall transition affecting the voltage drop of the said gate in the said critical path. The voltage drop for the said gate, and similarly for the other gates along the said critical path, is then evaluated by using the power network, power currents for the said set of gates and the said gate from the said critical path gates, and the pre-characterized library. Accordingly, re-verifying the timing utilizing new delays from updated voltage for each gate can be achieved. As to the modeling of power current, special method using multiple triangles is adopted to model power current correctly as function of operating voltage and triangles in terms of Q, T0, Tr, and T of each triangle.

It should be noted that a timing verification tool according to the invention may have one or more of the above-described capabilities in any combination, and any of these novel capabilities can be combined with conventional or other novel timing verification tools.

Accordingly, although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A computer-implemented method for performing voltage drop and surge analysis of a circuit with multi-phase sequential elements, comprising the computer implemented steps of:
   using timing analysis for multi-phase sequential circuit to generate critical path; and
   verifying the timing of a specified path by re-evaluating the new path delay and new timing constraint including new clock skew, new set up time, new hold time and new clock to output delay for sequential element in consideration of voltage drop effect for each gate along the critical path for multi-phase sequential circuit; and
   choosing the set of all the gates with their switching overlapping with switching for each gate along the critical path by considering functional dependence and signal propagation for multi-phase sequential circuit with non-uniform timing constraint in calculating voltage drop effect for the said gate along the said critical path for the said multi-phase sequential circuit; and
   pre-characterizing the timing library including power current and ground currents.

2. A computer-implemented method according to claim 1, wherein the step of using timing analysis for multi-phase sequential circuit, comprising the computer implemented steps of:
   identifying clock phases at a destination in the circuit; and
   computing the value Q(x, node, y) for a node with respect to a source clock phase y and a destination clock phase x as Q(x,node,y)=TimingConstraint(x,y), wherein TimingConstraint(x,y) is a timing constraint between source clock phase y and destination clock phase x; and
   computing AT(A,y), wherein AT(A,y) is the arrival time at node A for clock phase y.

3. A computer-implemented method according to claim 2, wherein for any pair of y and z from the set of source clock phases:
   if Q(x,node,y)<=Q(x,node,z) for all destination clock phase x, either store T(A,y) as is and T(A,z) as new_AT (A,y) for clock phase y for node A, wherein
   new_AT(A,y)=AT(A,z)+Q(x,z,A)−Q(x,y,A);
   or store T(A,z) as is and T(A,y) as new_AT(A,z) for clock phase z for node A
   new_AT(A,z)=AT(A,y)+Q(x,y,A)−Q(x,z,A);
   else if Q(x,node,y)>=Q(x,node,z) for all destination clock phase x, either store T(A,y) as is and T(A,z) as new_AT (A,y) for clock phase y for node A, wherein
   new_AT(A,y)=AT(A,z)+Q(x,z,A)−Q(x,y,A);
   or store T(A,z) as is and T(A,y) as new_AT(A,z) for clock phase z for node A
   new_AT(A,z)=AT(A,y)+Q(x,y,A)−Q(x,z,A); the node;
   else store AT(A,y) and AT(A,z) as they are for node A.

4. A computer-implemented method according to claim 3, further comprising the computer implemented steps of:
   storing all arrival times at each node not exceeding a user-given maximum number of times with respect to a plurality of source clock phases; and
   merging the new arrival time with the nearest arrival time to form an uncertain window when the maximum number of times is exceeded; and
   storing longest and shortest delay times at each node with respect to a plurality of source clock phases.

5. A computer-implemented method according to claim 1, wherein the step of re-evaluating the new path delay includes re-evaluating the new gate delay, comprising the computer implemented steps of:
   generating the logic constraint graph of the circuit with each node represented by two vertices for rise and fall transition and each edge representing the constraint; and
   obtaining the power and ground currents of the gate from the pre-characterized timing library; and
   finding power and ground currents of all the other gates with their switching overlapping with switching of this gate by considering functional dependence and signal propagation in the presence of multi-phase sequential elements; and
   feeding these power and ground currents to power and ground networks, respectively, and simulating the power and ground network to obtain the voltage drop and surge of this gate and its new VDD; and
   evaluating the new gate delay using its new VDD and pre-characterized timing library for delay as function of VDD.

6. A computer-implemented method according to claim 1, wherein the step of considering signal propagation, comprising the computer implemented steps of:
   computing the value Q(x, node, y) for a node with respect to a source clock phase y and a destination clock phase x as Q(x,node,y)=TimingConstraint(x,y), wherein TimingConstraint(x,y) is a timing constraint between source clock phase y and destination clock phase x; and
   examining a gate A along the specified path with input X by getting the triggering edge at time E of sequential element which the specified path originates from, defining the timing window size $\Delta t$ for the signal transition from X to the gate's output C and generating the window from B to B+$\Delta t$ denoted by [B,B+$\Delta t$] with B as the arrival time at node X evaluated from E; and
   selecting any node N in the circuit with several clock phases being stored and arrival times D recorded from the time of triggering edge F of each phase;
   getting timing window size $\Delta y$ for the signal making transition from node N to the output P of the gate driven by node N and the window is from D to D+$\Delta y$ denoted by [D, D+$\Delta y$];
   defining S as the set of the destination clock phases for nodes C and P;
   determining overlapping of two windows [B, B+$\Delta t$] and [D, D+$\Delta y$] with B and D counted from E and F, respectively, by checking both the two cases of E>F and F>E, and checking F>E first, comprising the computer implemented steps of:

```
if(Q(s,X,E) >=Q(s,X,F) for every s∈S){
        compare [B+E,B+E+Δt] &[D+F,D+F+Δy] ;
        if(overlap){
                report overlap;
        }
        else{
                report non_overlap;
        }
}
else if(Q(s,X,F) >=Q(s,X,E) for every s∈S){
        compare [B+E+P,B+E+P+Δt] &[D+F,D+F+Δy] ;
```

-continued

```
            if(overlap){
                    report overlap;
            }
            else{
                    report non_overlap;
            }
    }
    else{
            compare [B+E,B+E+Δt] &[D+F,D+F+Δy] ;
            if(overlap){
                    report overlap;
            }
            else{
                    compare [B+E+P,B+E+P+Δt] &[D+F,D+F+Δy];
                    if(overlap){
                            report overlap;
                    }
                    else{
                            report non_overlap;
                    }
            }
    }
considering F>E in the same manner as E<F.
```

7. A computer-implemented method according to claim 1, wherein the step of considering functional dependence, comprising the computer implemented steps of:
assigning rise or fall along the node of the specified path and VDD to UNKNOWN, GND to UNKNOWN, UNKNOWN to VDD, or UNKNOWN to GND to the side input of gates along the path and propagating these values to the rest of circuit to verify logic correctness; and
re-assigning definite logic value VDD or GND to the sided input of the gate if the side input does not change to RISE or FALL value; and
iterating logic verification process and generating logic values for each node; and
reducing the constraint graph by deleting vertex of the node; if
logic value generated by the logic verification process is VDD or GND; or
vertex stores RISE and logic value generated by the logic verification process is VDD to UNKNOWN or UNKNOWN to GND; or
vertex stores FALL and logic value generated by the logic verification process is UNKNOWN to VDD or GND to UNKNOWN.

8. A computer-implemented method according to claim 7, wherein the step of reducing the constraint graph, comprising the computer implemented step of:
reducing the constraint graph further by only considering a set of gates and their inputs with their transitions overlapping with that of a selected gate and its input along a specified path.

9. A computer-implemented method according to claim 1, wherein the step of pre-characterizing the timing library, comprising the computer implemented step of:
pre-characterizing power and ground currents of gate, logic cell consisting of several gates, and pre-characterizing set-up time, hold time, and clock to output delay of sequential cell.

10. A computer-implemented method according to claim 9, wherein the step of pre-characterizing power and ground currents of gate, comprising the computer implemented steps of:
modeling power current flowing into gate at the contact point and ground current flowing out of the device into the ground network in terms of one triangle being expressed by Q, T0, Tr, and T which are total charge for the transition, time between the starting point of the triangle and the input transition point, time between the from the starting point of the triangle to the point where the current is maximum, the total length of the time of the triangle, respectively;
expressing Q, T0, Tr, or T for one triangle as, $$X = \left(\sum_{i=1}^{5} f(i)Y(i)\right) + Vdd\left(\sum_{i=1}^{5} g(i)Y(i)\right) + (Vdd)^2\left(\sum_{i=1}^{5} h(i)Y(i)\right)$$

where X refers to Q, T0, Tr, or T
$Y(1)$=slew_time  $Y(2)$=out_load*slew_time  $Y(3)$=(out_load)$^3$
$Y(4)$=out_load  $Y(5)$=1
All f g and h are empirical fitting coefficient.

11. A computer-implemented method according to claim 9, wherein the step of pre-characterizing power and ground currents of logic cell, comprising the computer implemented steps of:
decomposing cell into gates and distinguish the power and ground currents between these gates; and
recording power current flowing into each gate at the contact point and ground current flowing out of the same gate and modeling the power or ground current by only one triangles in terms of Q, T0, Tr, and T;
reporting the result of modeling the power and ground current for the cell in terms of several triangles in terms of Q, T0, Tr, and T for each.

12. A computer-implemented method according to claim 9, wherein the step of pre-characterizing power and ground currents for set-up time, hold time, and clock to output delay of sequential cell, comprising the computer implemented steps of:
decomposing sequential cell into gates and distinguish the power and ground currents between these gates; and
recording power current flowing into each gate at the contact point and ground current flowing out of the same gate and modeling the power or ground current by only one triangles in terms of Q, T0, Tr, and T;
reporting the result of modeling the power and ground current for set-up time, hold time, and clock to output delay of sequential cell in terms of several triangles in terms of Q, T0, Tr, and T for each.

13. A computer-implemented method according to claim 1, wherein the step of re-evaluating the new path delay and new timing constraint including clock skew, comprising the computer implemented steps of:
using timing constraint to check set up and hold time violation for a selected path
Path_dly+sr_clk_dly+dest_set_up<TmCtrt+dest_clk_skw−src_clk_skw
Path_dly+sr_clk_dly>dest_hold_time+dest_clk_skw−src_clk_skw
where
Path_dly=Total Path delay for a selected path
sr_clk_dly=delay from the controlling clock of source flip-flop to its output
dest_set_up=set up time for destination flip-flop
TmCtrt=timing constraint between source and destination flip-flops due to controlling clock phase relationships
dest_clk_skw=delay from the primary clock input to the clock input of destination flip-flop src_clk_skw=delay from the primary clock input to the clock input of source flip-flop
dest_hold_time=hold time for destination flip-flop
re-evaluating the new path delay and new timing constraint including clock skew;
new_Path_dly+new_sr_clk_dly+ new_dest_set_up<new_TmCtrt+new_dest_clk_skw−src_clk_skw
new_Path_dly+new_sr_clk_dly>new_dest_hold_time+ new_dest_clk_skw−new_src_clk_skw
where
new_Path_dly=Total Path delay for a selected path considering voltage drop
new_sr_clk_dly=new delay from the controlling clock of source flip-flop to its output considering voltage drop
new_dest_set_up=new set up time for destination flip-flop considering voltage drop
new_TmCtrt=TmCtrt timing constraint between source and destination flip-flops due to controlling clock phase relationships without change considering voltage drop
new_dest_clk_skw=new delay from the primary clock input to the clock input of destination flip-flop considering voltage drop
new_src_clk_skw=new delay from the primary clock input to the clock input of source flip-flop considering voltage drop
new_dest_hold_time=new hold time for destination flip-flop considering voltage drop.

14. A computer-implemented method according to claim 1, wherein the step of re-evaluating the new path delay and new timing constraint including clock skew, comprising the computer implemented steps of:
generating the logic constraint graph of the circuit with each node represented by two vertices for rise and fall transition and each edge representing the constraint; and
identifying the gates the clock signal traverses from primary clock input to the clock input of the sequential cell and handling each of the gates for voltage drop analysis sequentially; and
calculating power and ground currents for each of these gates using the pre-characterized timing library and gate effective capacitance; and
finding power and ground currents of all the other gates with their switching overlapping with switching of the gate along the clock path by considering functional dependence and signal propagation in the presence of multi-phase sequential elements; and
evaluating voltage drops and surges by simulating power and ground networks with power and ground currents at contact points of each gate along clock path; and
re-evaluating gate delay including interconnect delay using new VDD for each gate along the clock path; and
summing all new gate delays and interconnect delays for the gates along the clock path to obtain the new clock skew.

15. A computer-implemented method according to claim 14, wherein the step of finding power and ground, comprising the computer implemented steps of:
examining a gate A along the specified clock path with input X by getting the triggering edge at time E of sequential element which the specified path originates from, defining the timing window size $\Delta t$ for the signal transition from X to the gate's output C and generating the window [B,B+$\Delta t$] with B as the arrival time at node X evaluated from E; and
selecting any node N in the circuit with several clock phases being stored and arrival time D recorded from the time of triggering edge F of each phase;
getting timing window size $\Delta y$ for the signal making transition from node N to the output of the driven gate of node N and the window is from D to D+$\Delta y$ denoted by [D, D+$\Delta y$];
determining overlapping of two windows [B, B+$\Delta t$] and [D, D+$\Delta y$] with B and D counted from E and F, respectively, by checking both the two cases of E>F and F>E, and checking F>E first, comprising the computer implemented steps of:

```
compare [B+E,B+E+Δt] &[D+F,D+F+Δy] ;
if(overlap){
    report overlap;
}
else{
    compare[B+E+P,B+E+P+Δt] &[D+F,D+F+Δy];
        if(overlap){
            report overlap;
        }
    else{
        report non_overlap;
    }
    if(overlap){
        report overlap;
    }
}
considering F>E in the same manner as E<F.
```

16. A computer-implemented method according to claim 1, wherein the step of re-evaluating the new path delay and new timing constraint including new set up time, new hold time and new clock to output delay, comprising the computer implemented steps of:
generating the logic constraint graph of the circuit with each node represented by two vertices for rise and fall transition and each edge representing the constraint; and
calculating power and ground currents associated with set up time, hold time, and clock to output delay for sequential element using the pre-characterized timing library; and
finding power and ground currents of all the other gates with their switching overlapping with switching of this sequential element by considering functional dependence and signal propagation in the presence of multi-phase sequential elements; and
evaluating voltage drop and surge by simulating power and ground networks with power and ground currents at contact points of the sequential element; and
re-evaluating set up time, hold time, and clock to output delay using its new VDD.

17. A non-transitory computer readable medium having instructions stored therein which, when executed by a computer, cause the computer to perform a method according to claim 1.

* * * * *